(12) United States Patent
Cunningham et al.

(10) Patent No.: US 9,804,760 B2
(45) Date of Patent: Oct. 31, 2017

(54) SCROLLABLE IN-LINE CAMERA FOR CAPTURING AND SHARING CONTENT

(71) Applicant: Apple Inc., Cupertino, CA (US)

(72) Inventors: Christopher R. Cunningham, Sunnyvale, CA (US); Daniel C. Hooper, Atlanta, GA (US); Giovanni Agnoli, San Mateo, CA (US); Peter M. Tullio, San Francisco, CA (US); Frank K. F. Lee, San Francisco, CA (US); Andrew J. Rauh, Dearborn, MI (US)

(73) Assignee: APPLE INC., Cupertino, CA (US)

( * ) Notice: Subject to any disclaimer, the term of this patent is extended or adjusted under 35 U.S.C. 154(b) by 411 days.

(21) Appl. No.: 14/246,572

(22) Filed: Apr. 7, 2014

(65) Prior Publication Data

US 2015/0058754 A1 Feb. 26, 2015

Related U.S. Application Data

(60) Provisional application No. 61/868,960, filed on Aug. 22, 2013.

(51) Int. Cl.
*G06F 3/00* (2006.01)
*G06F 3/0485* (2013.01)
(Continued)

(52) U.S. Cl.
CPC .......... *G06F 3/0485* (2013.01); *G06F 3/0482* (2013.01); *G06F 3/0488* (2013.01);
(Continued)

(58) Field of Classification Search
CPC ........................................ G06F 3/0481–3/0489
See application file for complete search history.

(56) References Cited

U.S. PATENT DOCUMENTS

| 7,546,554 B2 * | 6/2009 | Chiu | G06F 3/0481 715/719 |
| 7,697,054 B2 * | 4/2010 | Cazier | H04N 5/23293 345/619 |

(Continued)

FOREIGN PATENT DOCUMENTS

WO PCT/US2014/050014 8/2014

OTHER PUBLICATIONS

International Search Report and Written Opinion for PCT/US2014/050014, Oct. 24, 2014 (mailing date), Apple Inc.
(Continued)

*Primary Examiner* — Steven B Theriault
(74) *Attorney, Agent, or Firm* — DLA Piper LLP US

(57) ABSTRACT

Some embodiments described herein provide an application that includes a scrollable in-line camera for capturing and sharing media content. In some embodiments, the in-line camera is provided in a scrollable view of the application. The scrollable view has three distinct user interface portions, including an in-line camera section, a preview section, and a shared content section. The application's user can use the in-line camera section to capture a photo or a video clip. The preview section is a portion of the UI that allows a user to review a photo or video captured with the in-line camera. The user can also use the preview section to either delete or accept the content. If the user chooses to delete the content, the content is removed from the preview section. If the user chooses to accept the content, the content appears in the content sharing section.

19 Claims, 16 Drawing Sheets

(51) Int. Cl.
  *G06F 3/0482* (2013.01)
  *G06F 3/0484* (2013.01)
  *H04L 29/06* (2006.01)
  *G06F 3/0488* (2013.01)
  *H04N 5/232* (2006.01)
  *H04N 1/00* (2006.01)

(52) U.S. Cl.
  CPC ........ *G06F 3/04842* (2013.01); *H04L 65/403* (2013.01); *H04N 1/00* (2013.01); *H04N 5/23216* (2013.01)

(56) References Cited

U.S. PATENT DOCUMENTS

| | | | | |
|---|---|---|---|---|
| 8,069,414 | B2* | 11/2011 | Hartwig | G06F 17/30781 715/203 |
| 8,675,113 | B2* | 3/2014 | Rydenhag | 348/239 |
| 8,745,500 | B1* | 6/2014 | Kostello | G11B 27/031 386/282 |
| 9,043,691 | B2* | 5/2015 | Monro | G11B 27/034 715/201 |
| 9,111,579 | B2* | 8/2015 | Meaney | G11B 27/031 |
| 9,306,989 | B1* | 4/2016 | Jayaram | H04L 65/403 |
| 9,325,889 | B2* | 4/2016 | Desai | H04N 5/2258 |
| 2002/0070982 | A1 | 6/2002 | Hill et al. | |
| 2006/0020627 | A1* | 1/2006 | Poslinski | H04N 21/42661 |
| 2006/0103891 | A1 | 5/2006 | Atkins | |
| 2006/0268120 | A1* | 11/2006 | Funakura | H04N 1/00132 348/231.2 |
| 2008/0052742 | A1* | 2/2008 | Kopf | H04N 5/44591 725/34 |
| 2008/0055453 | A1* | 3/2008 | Battles | G03B 13/02 348/333.05 |
| 2008/0186385 | A1 | 8/2008 | O | |
| 2008/0231740 | A1* | 9/2008 | McIntyre | H04N 5/2251 348/333.01 |
| 2008/0288499 | A1 | 11/2008 | Choi et al. | |
| 2010/0063961 | A1 | 3/2010 | Guiheneuf et al. | |
| 2010/0153882 | A1* | 6/2010 | Nakagawa | G06F 17/3028 715/838 |
| 2010/0220197 | A1* | 9/2010 | Dukellis | G06Q 30/0253 348/207.1 |
| 2010/0262924 | A1 | 10/2010 | Kalu | |
| 2010/0275122 | A1* | 10/2010 | Buxton | G06F 1/1626 715/728 |
| 2011/0119619 | A1* | 5/2011 | Fong | H04N 5/23216 715/784 |
| 2011/0258556 | A1 | 10/2011 | Kiciman et al. | |
| 2011/0280497 | A1 | 11/2011 | Berger et al. | |
| 2012/0198334 | A1* | 8/2012 | Surin | G06Q 10/101 715/716 |
| 2012/0274808 | A1* | 11/2012 | Chong | H04N 5/2258 348/234 |
| 2012/0284638 | A1 | 11/2012 | Cutler et al. | |
| 2012/0308209 | A1* | 12/2012 | Zaletel | G11B 27/034 386/278 |
| 2012/0321280 | A1* | 12/2012 | Lin | G11B 27/105 386/240 |
| 2013/0066964 | A1 | 3/2013 | Odio et al. | |
| 2013/0124508 | A1 | 5/2013 | Paris et al. | |
| 2013/0151987 | A1* | 6/2013 | Flynn, III | G06F 3/0485 715/753 |
| 2013/0235071 | A1* | 9/2013 | Ubillos | G06F 3/0484 345/600 |
| 2013/0321340 | A1* | 12/2013 | Seo | G06F 1/1641 345/174 |
| 2013/0332856 | A1* | 12/2013 | Sanders | G06F 3/0481 715/753 |

OTHER PUBLICATIONS

Muchmore, Michael, et al., "Apple iCloud Review & Rating—part 2," Jan. 31, 2012, 6 pages, available at http://www.pcmag.com/article2/0,2817,2394614,00.aspz.

Spector, Lincoln, "Your complete guide to the Android camera," Jan. 2, 2013, 7 pages, available at http://www.techhive.com/article/2021321/your-complete-guide-to theandroid-camera.html?page=2.

Tim-o-tato, "Android 4.1 Jelly Bean: Tips and Tricks," Jun. 28, 2012, 4 pages, available at http://www.droid-life.com/2012/06/28/jelly-bean-tips-and-tricks/.

* cited by examiner

SCROLLABLE IN-LINE CAMERA FOR CAPTURING AND SHARING CONTENT

CLAIM OF BENEFIT TO PRIOR APPLICATIONS

This application claims the benefit to U.S. Provisional Patent Application 61/868,960, entitled "Scrollable In-Line Camera for Capturing and Sharing Content" filed Aug. 22, 2013.

BACKGROUND

In today's digital age, there are many different ways that people can share media content, such as photographs and video clips. As an example, a person can take a picture and share it with some friends by posting it to a social network website. The person can also take a group of pictures and create a slide show presentation with a music track to share with other people. Thus, a person can choose one or more different ways to share media content.

Although a person can make such a choice, the task of actually sharing media content can be cumbersome. This usually entails the person opening different applications that executes on a computing device and navigating through various application screens. For example, in sharing a photo, the person has to first open the device's camera application to capture the photo. The person has to then open a photo application and navigate to a camera roll screen or some other collection screen to review the photo. From there, if the person is satisfied with the photo, the person can open a social network application and upload the photo to a social network website. However, if the person is not satisfied, he or she must reopen the device's camera application to take another photo, and repeat the same cumbersome process.

BRIEF SUMMARY

Some embodiments described herein provide an application that includes a scrollable in-line camera for capturing media content. The scrollable in-line camera of some embodiments is a real-time media capture tool that provides a user with the ability to capture media content in real-time. That is, the in-line camera displays a live view of a scene and includes a set of affordances to take a picture or a video of that scene. In some embodiments, the in-line camera is provided in a scrollable view (e.g., a scrollable page) of the application. The in-line camera can be hidden or revealed by scrolling the view in different directions (e.g., up and down, side to side).

The scrollable view of some embodiments has three distinct user interface (UI) portions. The three portions are accessible by scrolling to each of the first, second, and third portions of the scrollable view. In some embodiments, the scrollable view includes an in-line camera section, a preview section, and a content browsing section. The application's user can use the in-line camera section to capture a photo or a video clip. The preview section is a portion of the UI that allows a user to review a photo or video captured with the in-line camera. The user can also use the preview section to either delete or accept the content. If the user chooses to delete the content, the content is removed from the preview section. On the other hand, if the user chooses to accept the content, the content appears in the content browsing section.

In some embodiments, when a piece of content has been accepted, it is posted to a website so that it could be shared with a particular group of people. Alternatively, or conjunctively, the content browsing section is a streaming section that presents a shared photo stream album. The shared photo stream album of some embodiments represents a streaming album in which its contents (e.g., photos, videos) are distributed across to each device of one or more people that is associated with (e.g., that has subscribed to) the shared photo stream album. Instead of the shared photo stream album, the streaming section may display a user's personal photo stream album in which its content is distributed across to only the user's other devices.

The application of some embodiments provides the in-line camera as the first section (e.g., top portion if the scrollable view only scrolls vertically, left portion if the scrollable view only scrolls horizontally, or top-left portion if the scrollable view scrolls both horizontally and vertically). The application also provides the preview section as the second section and the content browsing section as the third section. The user can scroll the scrollable view to display one or more of these different sections. By doing so, the user can take a photo or video, review it, and share it. All of these different tasks can be done on a single application display screen. That is, different from previous techniques, a person does not have to open different applications and navigate through various application screens. The person can simply use a three-step approach to share content, namely open the application, capture the content with the in-line camera, and post the content.

The scrollable view of some embodiments allows a user to create and edit a slide show presentation. In some such embodiments, the scrollable view includes a first portion with the inline camera and a second portion to display the slide show and each captured content. As an example, the second portion may include a first region for displaying a scrollable slide show presentation and at least a second bounded region for displaying at least one captured media item. The user can then review each media item in the bounded region, and decide whether to add the photo to a slide show presentation or delete the photo. If the user chooses to keep the photo, the photo appears in the scrollable slide show presentation. The new content may be added to the slide show presentation as the last content of the slideshow (e.g., picture or video that is displayed last) or the first content (e.g., picture or video that is displayed first). The application of some embodiments allows a user to choose a location or position to add the new content. For example, the user can scroll the slide show presentation to a particular image and add the captured content before or after that particular image.

The preceding Summary is intended to serve as a brief introduction to some embodiments as described herein. It is not meant to be an introduction or overview of all subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features as described here are set forth in the appended claims. However, for purposes of explanation, several embodiments are set forth in the following figures.

DETAILED DESCRIPTION

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments described herein provide an application that includes a scrollable in-line camera for capturing media content. The scrollable in-line camera of some embodiments is a real-time media capture tool that provides a user with the ability to capture media content in real-time. That is, the in-line camera displays a live view of a scene and includes a set of affordances to take a picture or a video of that scene. In some embodiments, the in-line camera is provided in a scrollable view (e.g., a scrollable page) of the application. The in-line camera can be hidden or revealed by scrolling the view in different directions (e.g., up and down, side to side).

The scrollable view of some embodiments has or is divided into three distinct user interface (UI) portions. The three portions are accessible by scrolling to each of the first, second, and third portions of the scrollable view. In some embodiments, the scrollable view includes an in-line camera section, a preview section, and a content browsing section. The application's user can use the in-line camera section to capture a photo or a video clip. The preview section is a portion of the UI that allows a user to review a photo or video captured with the in-line camera. The user can also use the preview section to either delete or accept the content. If the user chooses to delete the content, the content is removed from the preview section. On the other hand, if the user chooses to accept the content, the content appears in the content browsing section.

In some embodiments, when a piece of content has been accepted, it is posted to a website so that it could be shared with a particular group of people. Alternatively, or conjunctively, the content browsing section is a streaming section that presents a shared photo stream album. The shared photo stream album of some embodiments represents a streaming album in which its contents (e.g., photos, videos) are distributed across to each device of one or more people that is associated with (e.g., that has subscribed to) the shared photo stream album. Instead of the shared photo stream album, the content browsing section may display a user's personal photo stream album in which its content is distributed across to only the user's other devices.

Figure 1:
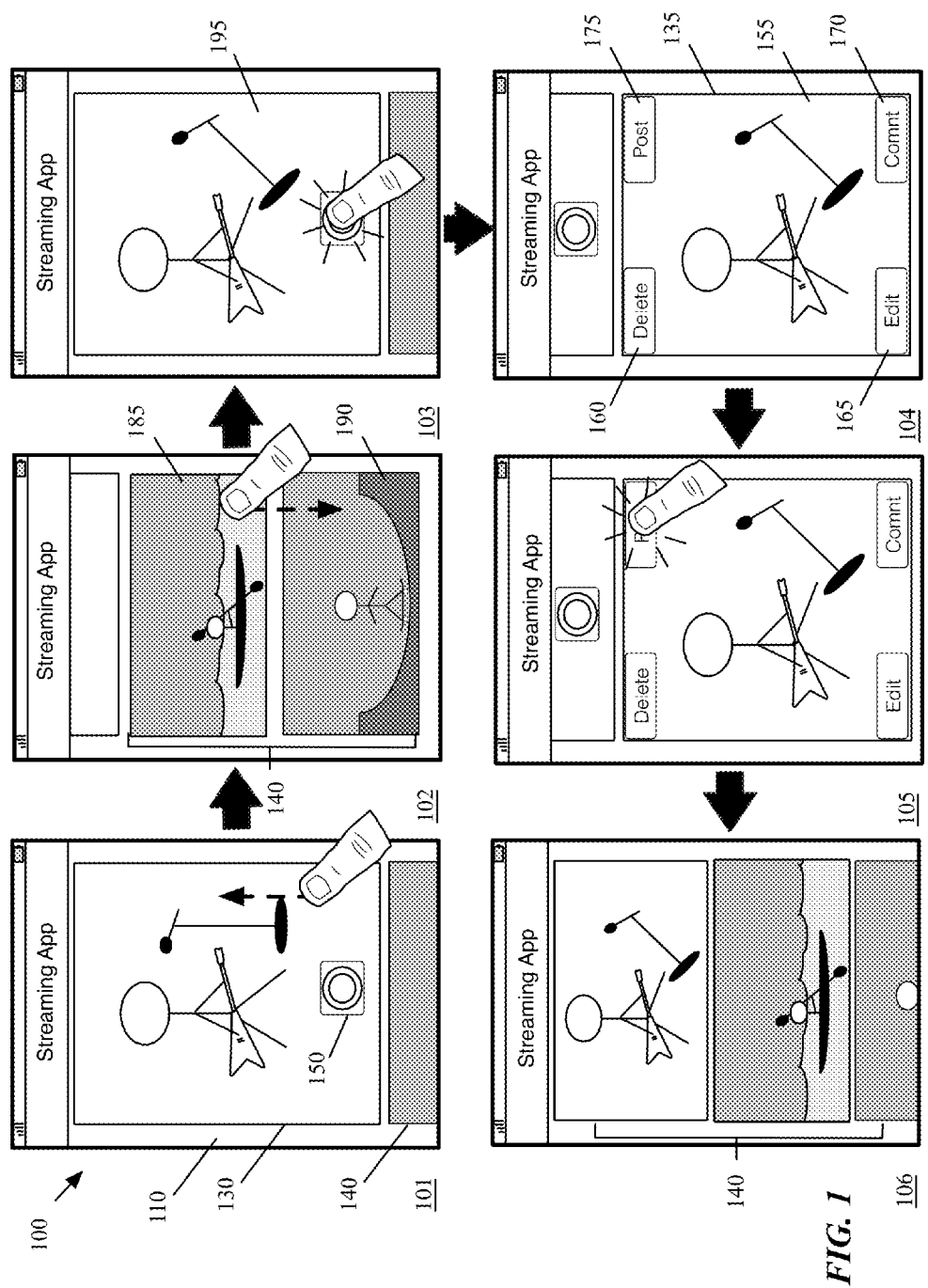
FIG. 1 illustrates a general view of a streaming application that includes a scrollable view with an in-line camera.

For some embodiments, FIG. 1 illustrates a streaming application that includes a scrollable view with an in-line camera. Specifically, the figure illustrates the application's GUI 100 that includes a single scrollable view 110 with three distinct sections, including an in-line camera section 130, a preview section 135, and a content browsing section 140. Six operational stages 101-106 of the application are shown in this figure. These operations illustrate scrolling through different sections of the display area to capture, preview, and share a photo. In this example, the application executes on a smart phone. However, one of ordinary skill in the art will realize that the discussion in this example as well as other examples discussed hereinafter is equally applicable to other kinds of mobile devices (e.g., a tablet, laptop, etc.) or any other electronic devices.

The in-line camera 130 displays a preview scene from a vantage point of the device's camera (e.g., front-facing or rear-facing camera). The in-line camera also provides at least one affordance to take a picture or a video. As shown in this figure, the affordance is a button 150. In this example, the button is shown near the bottom of the section with the in-line camera and overlays the camera preview scene. This button can be selected to take a picture or a video. In some embodiments, different types of selection of the button 150 will result in capturing different types of media content. For example, the user can tap the user's finger on the device's touchscreen over the button to take a picture. Alternatively, the user can tap and hold the person's finger over the button to take a video.

In some embodiments, the in-line camera section 130 provides other affordances to modify settings for capturing content. For example, the in-line camera section can provide an affordance to set the camera's flash to on, off, or automatic based on the lighting conditions. The in-line camera section of some embodiments includes an affordance for switching from using the rear-facing camera to the front-facing camera, or vice versa. Also, instead of a one-button approach, the inline camera section of some embodiments may provide an option to switch between taking pictures or videos.

In the example of FIG. 1, the user can direct the device to capture real-time content by selecting the button 150 (e.g., by performing a gesture such as tapping the user's finger on the button). Upon capturing the content, the application displays the content in the preview section 135, as illustrated in stage 104 of the figure. As shown, the preview section displays a preview of the content captured with the in-line camera. Here, the preview of the content is displayed in a review area. Overlaying this area are affordances to accept or reject the captured content. Here, the affordances are post and delete buttons 175 and 160. These buttons 175 and 160 are placed along the top portion of the preview image 155, and overlay the review area.

The delete button can be used to delete the content displayed in the preview section. The post button can be used to accept the content. Once accepted, the application adds the content to the content browsing section 140 and may publish the content across the user's device and/or publish the content to one or more devices of other users. Alternatively, the content may be posted to a website so that it could be shared with a particular group of people.

In some embodiments, the preview section 130 provides other affordances to edit the content and/or leave a comment regarding the content. This is shown in FIG. 1 by the preview section showing an edit button 165 and a comment button 170. These buttons are shown near the bottom of the preview image, and overlay the review area. The comment button 170 and the edit button 165 are other examples of how the application of some embodiments allows a person to accomplish multiple different tasks in one scrollable view. For example, the user can take a picture, edit the picture, leave a comment regarding the picture, and then post the picture, all in this one scrollable view.

The edit button 165 in some embodiments can be used to initiate an editing operation on the displayed content. That is, when the button is selected, the application might provide a set of editing tools to edit the content. Different applications might provide different editing tools. Examples of such editing tools include different filters to enhance a photo or change its look (e.g., make it black or white, make it appear as if it is taken with a Polaroid camera, etc.), crop the photo, remove redeye from the photo, etc. For a video clip, the application might provide tools to trim the clip, apply a theme to the clip, combine it with another clip, add a title, etc. The editing tools of some embodiments will be descried in more detail below in Section II.

Different from the edit button 165, the comment button 170 is for associating a comment with the preview content. In some embodiments, when the content is associated with a comment and a person selects the post button 175, the preview content is published to a website with the associated comment. In other words, people can view the content in a webpage with that associated comment. In some embodiments, the content and the comment is pushed to one or more devices of different users. Once pushed, each device presents the content with the comment.

One of ordinary skill in the art would understand that the GUI 100 presented in FIG. 1 is just an example of a scrollable view with a scrollable in-line camera, and that the GUI can be presented differently in different embodiments. For example, depending on the screen real estate, each affordance may not overlay a particular section but appear above or below the section. One or more of the soft-buttons may also be provided as physical buttons on a device. Moreover, although the scrolling effect is shown as being a vertical scroll, the scrolling effect can be a horizontal scroll, or a combination of a vertical and horizontal scroll in some embodiments.

Having described the elements of the GUI 100 and the three different sections of the scrollable view 110, the operations of capturing and sharing content will now be described by reference to the state of the GUI 100 during the six stages 101-106 that are illustrated in FIG. 1. In the first stage 101, the scrollable view 110 displays the in-line camera section 130 with the button 150 for capturing content. Here, the in-line camera section shows a scene from a vantage point of the device's rear-facing camera. The scene includes a person that plays a guitar. While the majority of the display area is devoted to the in-line camera section, the display area's bottom portion reveals a portion of another section, namely the content browsing section 140.

In the first stage 101, the user inputs a touch gesture on the device's touch-sensitive screen to scroll the display area. Specifically, the first stage 101 illustrates that the user is scrolling the scrollable view 110 up in order to view the content of other sections. To scroll up, the user places the user's finger on the touch-sensitive screen and drags it up the screen. This gesture causes the display area to scroll up in accord with the finger movement.

The second stage 102 illustrates that as the result of scrolling up the scrollable view 110, the application now displays more contents in the content browsing section 140 of the scrollable view. The reason that there is no preview section in the scrollable view at this stage is that there is no preview content to accept or reject yet. In other words, the user has not used the in-line camera to capture any one or more new photos or video clips yet. At this stage, only two photos 185 and 190 are show in the content browsing section 140. However, there can be many more photos and videos in this section that require more scrolling to be displayed. Also, although only two photos are simultaneously displayed, the content browsing section may simultaneously display many other more photos and videos depending on the size of each representation and the size of the device's screen. Here, the two photos 185 and 190 represent photos that are shared with a group of people.

Different from the first stage 101, the second stage 102 shows inputting a touch gesture to scroll in the opposite direction (i.e., downward). To scroll down, the user places the user's finger on the touch-sensitive screen and drags it down the screen. This gesture causes the display area to scroll down in accord with the finger movement. The third stage 103 illustrates that the gesture has caused the display area to display a full view of the in-line camera section 130 again. The in-line camera section shows a scene from the vantage point of the device's rear-facing camera. The scene includes the same person still playing the guitar.

The third stage 103 illustrates taking a picture with the in-line camera. Specifically, the user taps the user's finger on the touch screen display over the button 150. The touch gesture causes the device to take a snapshot of the scene that is displayed in the in-line camera section. This in turn causes the scrollable view 110 to be expanded to include a preview section 135, as illustrated in the fourth stage 104.

In the fourth stage 104, the application is displaying the preview section of the scrollable view 110 as the result of capturing the photo 195 in the previous stage. In some embodiments, the preview section of the display area will be displayed automatically after capturing a new content. In some embodiments, the user has to scroll down the scrollable view to the preview section after capturing the content in order to view and/or interact with the preview content.

The GUI 100 at this stage is showing the photo 195 as well as the four buttons 160-175 in the preview section of the scrollable view. Selection of the delete button 160 in some embodiments will delete the content from the preview area. Selection of the edit button 165 in some embodiments will provide a set of editing tools to edit the captured content. Selection of the comment button 170 in some embodiments will allow the user to associate one or more comments with the content. Finally, selection of the post button 175 in some embodiments will add the content to the content browsing section, which in turn can result in sharing the content with other users. Although a brief description for each button was given here, all these buttons will be described in more detail in Section III below.

The fifth stage 105 illustrates that the user is selecting the post button 175 (e.g., by performing a gesture such as tapping the user's finger on the button). As stated above, by selecting the post button 175, the application will add the content to the content browsing section so that the content can be shared with a particular group of people.

The sixth stage 106 illustrates that as the result of selecting the post button 175, the photo 195 is added to the content browsing section 140 of the scrollable view. In some embodiments the newly added content to the content browsing section will be displayed automatically after capturing the content, while in other embodiments, the user has to scroll down to the content browsing section after posting the preview image. In some embodiments, the recently added content will be placed at the beginning of the content browsing section of the scrollable view, while, in other embodiments, the recently added content will be placed at the end of the content browsing section and after its last content.

In the example of FIG. 1, the in-line camera has a viewing area 195 for displaying a live view of a scene from a vantage point of the device's camera. This viewing area 195 is shown as being the same or similar in size as the preview representation shown in the preview section. The viewing area is also shown as being larger than each thumbnail representation in the content browsing section. However, some embodiments present these items differently. For example, the viewing area, the preview image, and the posted or accepted image area can be represented in a scrollable view as having the same size or different sizes. Each area can be square or have a portrait or landscape orientation. Furthermore, the size of one or more of these areas may be configurable. For example, the application may provide an option to change the size of the viewing area and/or the size of the thumbnail representations in the preview section and/or the content browsing section.

In some embodiments, the scrollable view is defined by a two-dimensional grid that contains a fixed number of cells along one dimension and a varying number of cells along the other dimension. In some such embodiments, each item (e.g., the live view, a thumbnail representation) can occupy one grid cell or multiple grid cells. For example, the live view can occupy the same number of cells along both the horizontal and vertical direction. If each cell is defined to be square, this creates a square area to display a real-time view of a scene from the vantage point of a camera. Similarly, each representation may be shown in a particular size according to the number of cells that it occupies in the horizontal and vertical directions.

A general view of an application of some embodiments is presented above by describing different stages of FIG. 1. Many more examples of interacting with a scrollable view of some embodiments are described in the following sections.

Section I describes several examples of accessing the scrollable in-line camera. Section II then describes several additional examples of capturing media content. Following this section, Section III describes different features of the preview section of the scrollable view. Next, Section IV describes the streaming section of the scrollable view of some embodiments. Then in Section V, a few other alternative embodiments are discussed. Finally, Section VI describes several example electronic systems that implement some embodiments described herein.

I. Accessing the Scrollable In-Line Camera

The scrollable in-line camera of some embodiments is provided as part of a stand-alone streaming application that executes on a device's operating system. The streaming application of some embodiments can be opened through another application (e.g., a photo application). In some embodiments, the streaming application is not a stand-alone application but is instead a feature or a mode of another application (e.g., a camera application). Several different examples accessing the scrollable in-line camera will now be described below by reference to FIGS. 2-4.

A. From the Home Page Screen

As mentioned above, the scrollable in-line camera of some embodiments is provided as part of a stand-alone application. In some such embodiments, the application allows a person to easily share content through a three-step approach. The approach entails (1) launching the application from the device's home page screen, (2) capturing a photo or a video with the in-line camera, and (3) posting the content with a preview tool.

Figure 2:
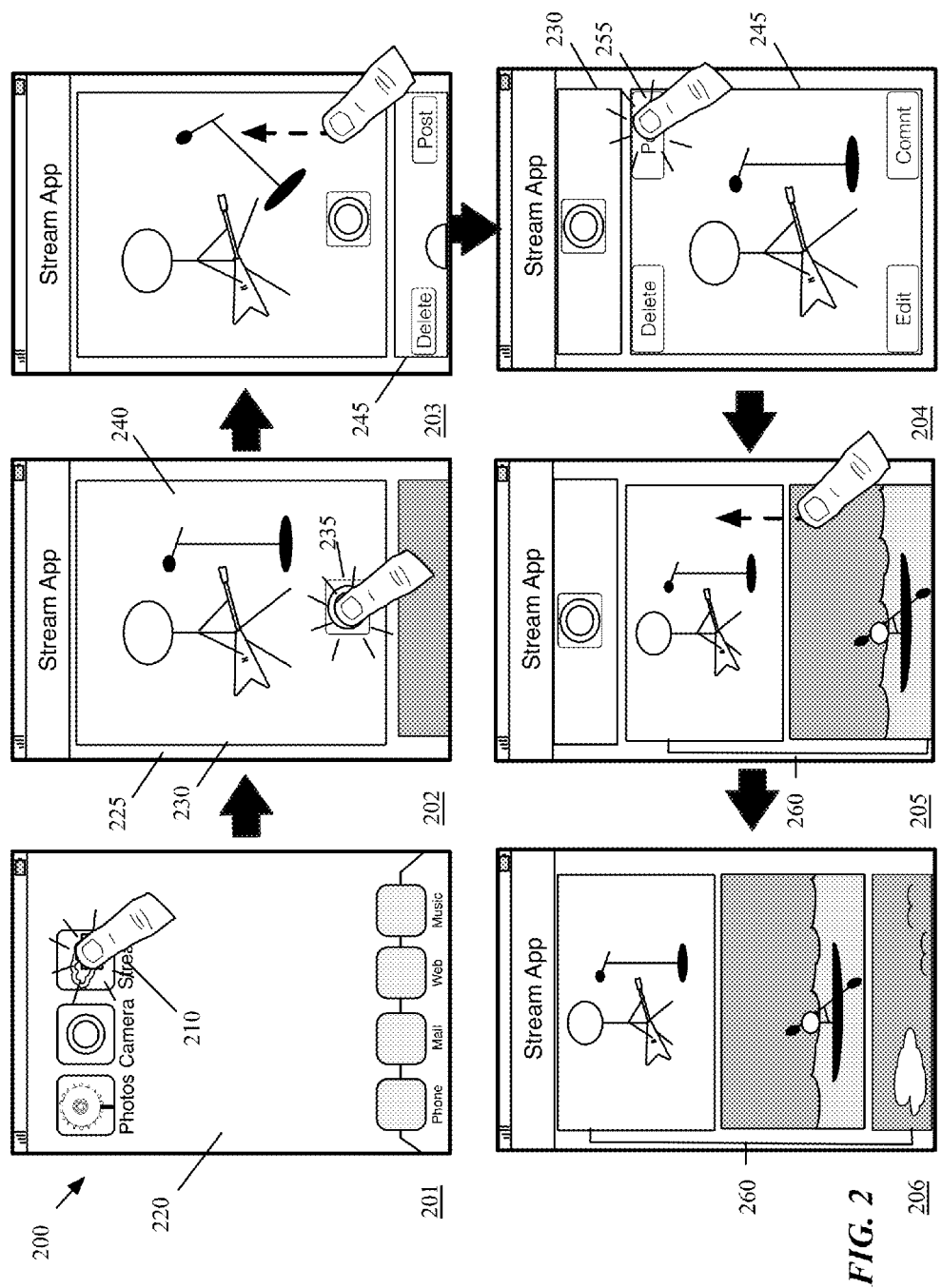
FIG. 2 illustrates an example of how a person can make three selections on his or her device to capture a picture and share it with a group of people.

FIG. 2 illustrates an example of how a person can make three selections on his or her device to capture a picture and share it with a group of people. Six operational stages 201-206 of the device 200 are show in this figure. In this example, the device is a smart phone with a touch-sensitive screen.

As shown, the touch-sensitive screen displays a home screen page on which application icons can be arranged. The home screen page is overlaid by a dock on which the icons of several key applications (e.g., phone, e-mail, browser and music applications) can be arranged. Through this home page screen 220, a user can touch-select an application icon to open or switch to a previously opened application, or can make other gestures to navigate between the pages of the device.

The first stage 201 illustrates the first step in the three-step approach, which is opening the application with the in-line camera. Specifically, the home page screen 220 displays the application's icon. To open the application, the user selects the icon 210 by tapping the user's finger over it on the touch-sensitive screen. The selection causes the application to be opened, as illustrated in the second stage 202. The second stage 202 illustrates that the application has been opened to a scrollable screen 225 with the in-line camera 230. This is important because the application's user does not have to make a subsequent selection to direct the application to navigate to another page with the in-line camera. In some embodiments, the scrollable screen 225 with the in-line camera is always the first screen that is shown when the application has been invoked (e.g. initially opened or launched). That is, when the application has not been launched or opened (e.g., and is not executing in the background), a user input to open the application will result in the display of the scrollable view 225.

The second stage 202 illustrates the second step in the three-step approach, which is taking a picture with the in-line camera. Specifically, the in-line camera shows a scene from a vantage point of the device's rear-facing camera. The scene includes a person that is playing a guitar. To take a picture, the user taps the user's finger on the touch screen display over the button 235. The touch gesture causes the device to take a snapshot of the scene that is displayed in the in-line camera section.

The third stage 203 illustrates the streaming application after taking the picture. As illustrated at this stage, the captured image 240 has been added to a preview section 245 of the scrollable view. However, only a top-portion of the preview section 245 is shown in this stage because the in-line camera section has taken the rest of the screen. In the example of the third stage 203, the application adds a representation of the captured image to the preview section. However, the device's user has to scroll the page to view (e.g., fully view) the captured image. In some embodiments, when a piece of content is captured with the in-line camera, the application adds the content to the preview section and automatically scrolls the page to the preview section. The third stage also shows that the user is scrolling the scrollable view up by using a touch gesture (e.g., by moving or dragging the user's finger up on the device's touch-sensitive screen).

The fourth stage 204 illustrates that as the result of scrolling up the scrollable view 225, the streaming application now displays the captured image 240 in the preview section 245. This stage also shows that while the application now displays the whole second portion of the scrollable view, only a bottom-portion of the in-lone camera section is displayed by the application. The fourth stage 204 illustrates the third and final step in the three-step approach, which is posting the picture with an affordance (e.g., a share button or a post button). In this example, the affordance is a post button. At the fourth stage 204, the user directs the device to share the image by tapping the user's finger on touch-sensitive screen over the post button 255.

The fifth stage 205 illustrates that the captured image has been added to the content browsing section. Specifically, it has been added to the content browsing section 260 as the first image (e.g., the top-image). The application of some embodiments, upon posting of a recently captured image, adds the image to the beginning of the content browsing section of the scrollable view. Alternatively, the application may show the image as a last image in the series. The fifth stage 205 also shows that the user is scrolling the scrollable view further upward by using a touch gesture (e.g., by dragging the user's finger up on the device's touch-sensitive screen).

The sixth stage 206 illustrates that the application, as the result of scrolling up the scrollable view, displays other shared contents in the content browsing section 260 of the scrollable view 225. Although not displayed in this figure, one of ordinary skill in the art would realize that further scrolling of the scrollable view would result in more content being displayed by the application until the application reaches the last shared media content.

In the example described above, a single application (e.g., a media sharing application) has a single UI display area (e.g., screen, page, window, pane) that contains the in-line camera, preview, content browsing portions. This is different from three separate windows of multiple different applications being opened on a desktop or a home screen. The person sharing the media item does not have to open multiple different application and switch between different windows to capture, review, and share content. All of these different tasks can be performed simply by opening the application to the single UI display area.

B. From within Another Application

Figure 3:
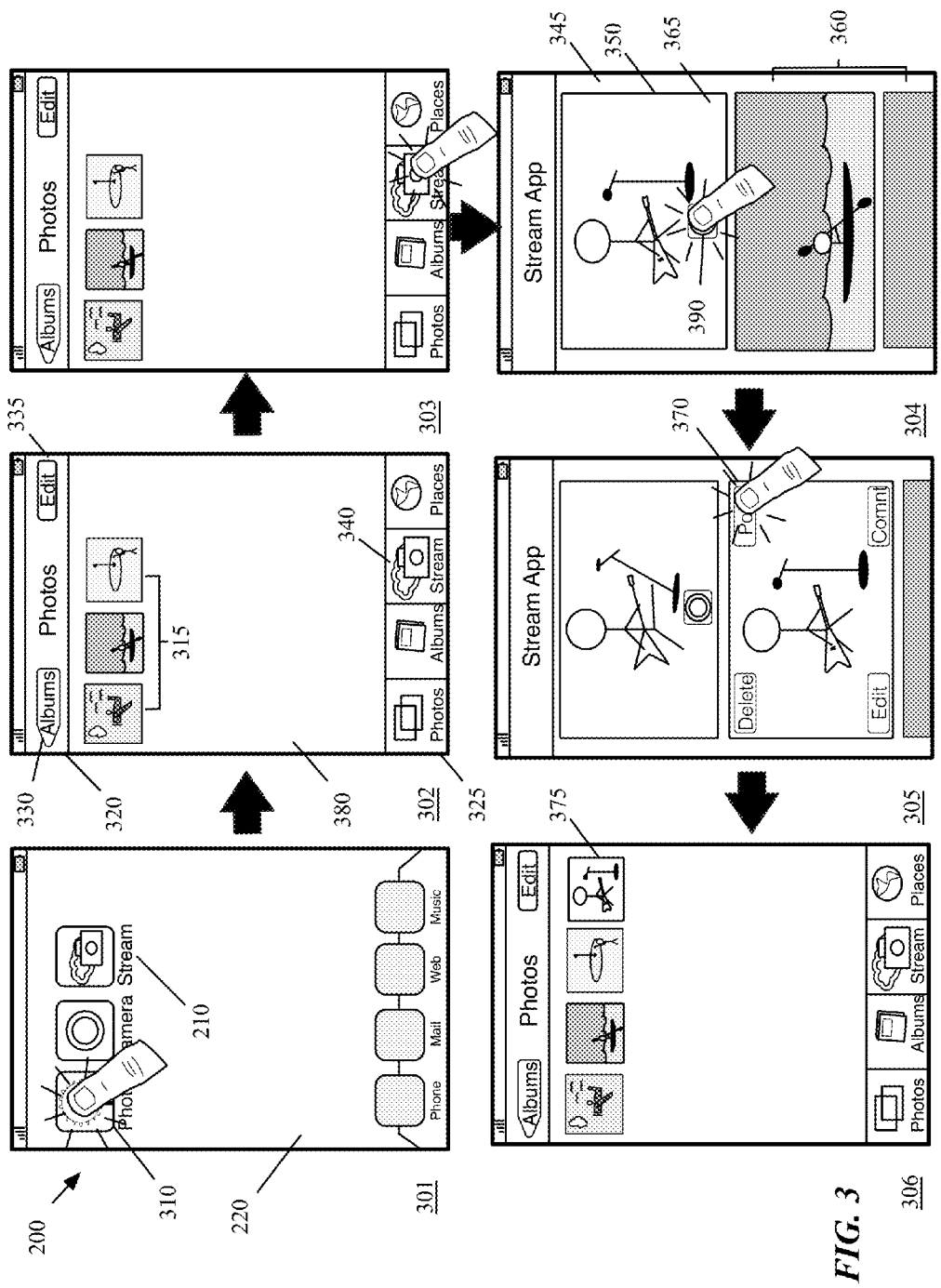
FIG. 3 illustrates an example of opening the steaming application from a photo application.

The previous example illustrated opening the streaming application from the home page screen. As mentioned above, the streaming application of some embodiments can be opened through another application such as a photo application. FIG. 3 illustrates an example of opening the steaming application from a photo application. Specifically, this figure illustrates a three-step approach can be initiated from within the photo application rather than a home screen page. Here, the three-step approach entails opening the streaming application within the photo application, capturing a photo or a video with the in-line camera, and posting the content with a preview tool. Six operational stages 301-306 of the smart phone are shown in the figure.

In the first stage 301, the home screen page 220 displays the streaming application's icon 210 and the photo application. To open the photo application, the user selects the icon 310 by tapping the user's finger over it on the touch-sensitive screen. The selection causes the photo application to be opened, as illustrated in the second stage 302.

The second stage 302 illustrates the device 200 after the photo application has been opened. In this stage, the photo application's GUI includes a main display area 380 that is overlaid by a top bar 320 and a bottom bar 325. In the main display area 380, three thumbnail representations 315 are displayed. The top bar 320 includes the title of the application (i.e., "Photos"), and two buttons 330 and 335, which are for opening the Album to which the photos 315 belong, and editing a selected photo respectively. The bottom bar 325 includes a number of selectable icons including the icon 340. Each one of these icons is for opening another application related to the photo application. Icon 340 is for opening a streaming application of some embodiments while the photo application is being executed by the operating system of the device.

The third stage 303 illustrates that the user has selected the icon 340 (e.g., by performing a gesture such as tapping the user's finger on the icon) from the bottom bar 325. As stated in the previous stage and can be seen in the next stage, selection of this icon will result in opening the scrollable camera.

The fourth stage 304 shows that the scrollable camera has been opened directly from the photo application. This stage illustrates different sections of the scrollable view 345 including the in-line camera section 350 and content browsing section 360. The first section (i.e., in-line camera section) presently is displaying image 365. The stage 304 also illustrates that the user has selected button 390 in order to capture the image 365.

The fifth stage 305 shows that the application now displays the second section of the scrollable view 345 (i.e., the preview section") in the display area as the result of capturing the photo 365 in the previous stage. The fifth stage also shows that the user has selected button 370 (e.g., by performing a gesture such as tapping the user's finger on the button) in order to post the captured photo as a shared content to the content browsing section 360.

The sixth stage 306 shows the same GUI as in the second stage 202 with one exception. As illustrated in this stage, a thumbnail 375, which represents the photo 365, is now added to the group of thumbnails 315 as the result of capturing the image 365 at the fourth stage 304. This is because upon capturing the new content, besides adding the content to the preview section, the application of some embodiments automatically adds the content to a media library (such as the library displayed by the photo application in this example). The media library in some embodiments represents a collection of media content that is associated with the device or captured with the device. Accordingly, in addition to the preview section, the content captured with the in-line camera may appear in another different display area (e.g., a camera roll display area) that displays thumbnail representations of all media content that are associated with the device. As illustrated in this figure, notwithstanding the captured image is added to the content browsing section or not, the captured image is added to the series of photos in the photo application.

C. Different Modality

Figure 4:
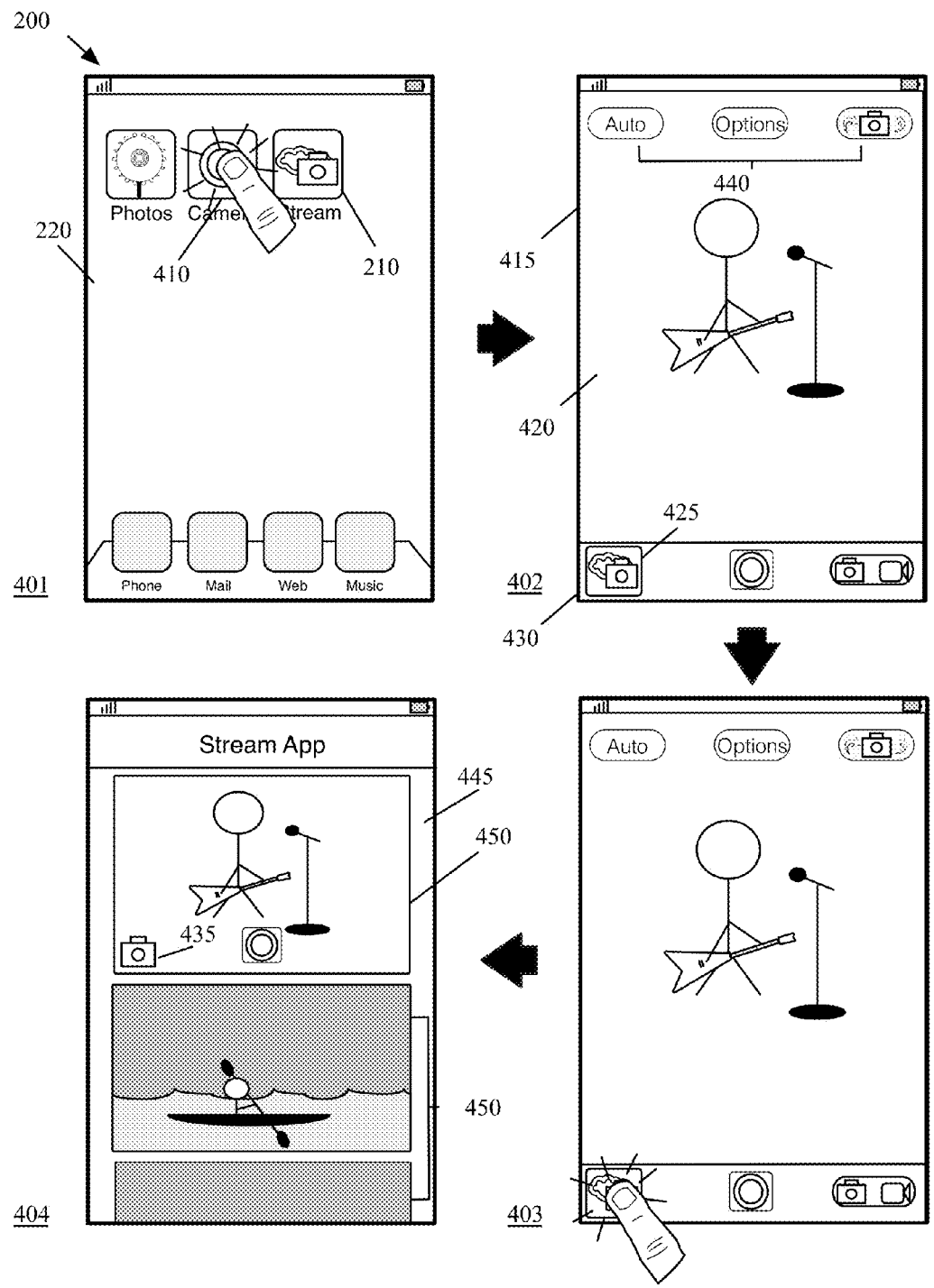
FIG. 4 provides an illustrative example of how the scrollable in-line camera can be provided as a different mode of a camera application.

In some embodiments, the streaming application is not a stand-alone application but is a different modality of another application. FIG. 4 provides an illustrative example of how the scrollable in-line camera can be provided as a different mode of a camera application. Four operational stages 401-404 of the device 200 are show in this figure.

In the first stage 401, the home screen page 220 displays the streaming application's icon 210 and the camera application. To open the camera application, the user selects the icon 410 by tapping the user's finger over it on the touch-sensitive screen. The selection causes the camera application to be opened, as illustrated in the second stage 402.

The second stage 402 illustrates the device 200 after the camera application has been opened. In this stage, the camera application's GUI includes a preview area 420, which displays a scene from a vantage point of the device's camera (e.g., front-facing or rear-facing camera). The preview area is overlaid by three top buttons 440 and a bottom bar 430. The bottom bar 430 includes several icons for capturing photos and/or videos, and also changing the mode of the camera application. Particularly, icon 425 is for changing the display screen to display the streaming application as a different modality of the camera application.

The third stage 403 illustrates that the user has selected the icon 425 (e.g., by performing a gesture such as tapping the user's finger on the icon) from the bottom bar 430. The fourth stage 404 shows that the camera application's GUI now displays the scrollable view 445 with its different sections. The different sections of the scrollable view in this stage are the in-line camera section 450 and content browsing section 455. As illustrated, in addition to a preview area and a capture button, the in-line camera section now includes a button 435 for switching back to camera application mode. Although not displayed in this figure, selection of the button 435 will result in changing the display back to camera mode display (as illustrated in the stage 402).

D. Example States

Figure 5:
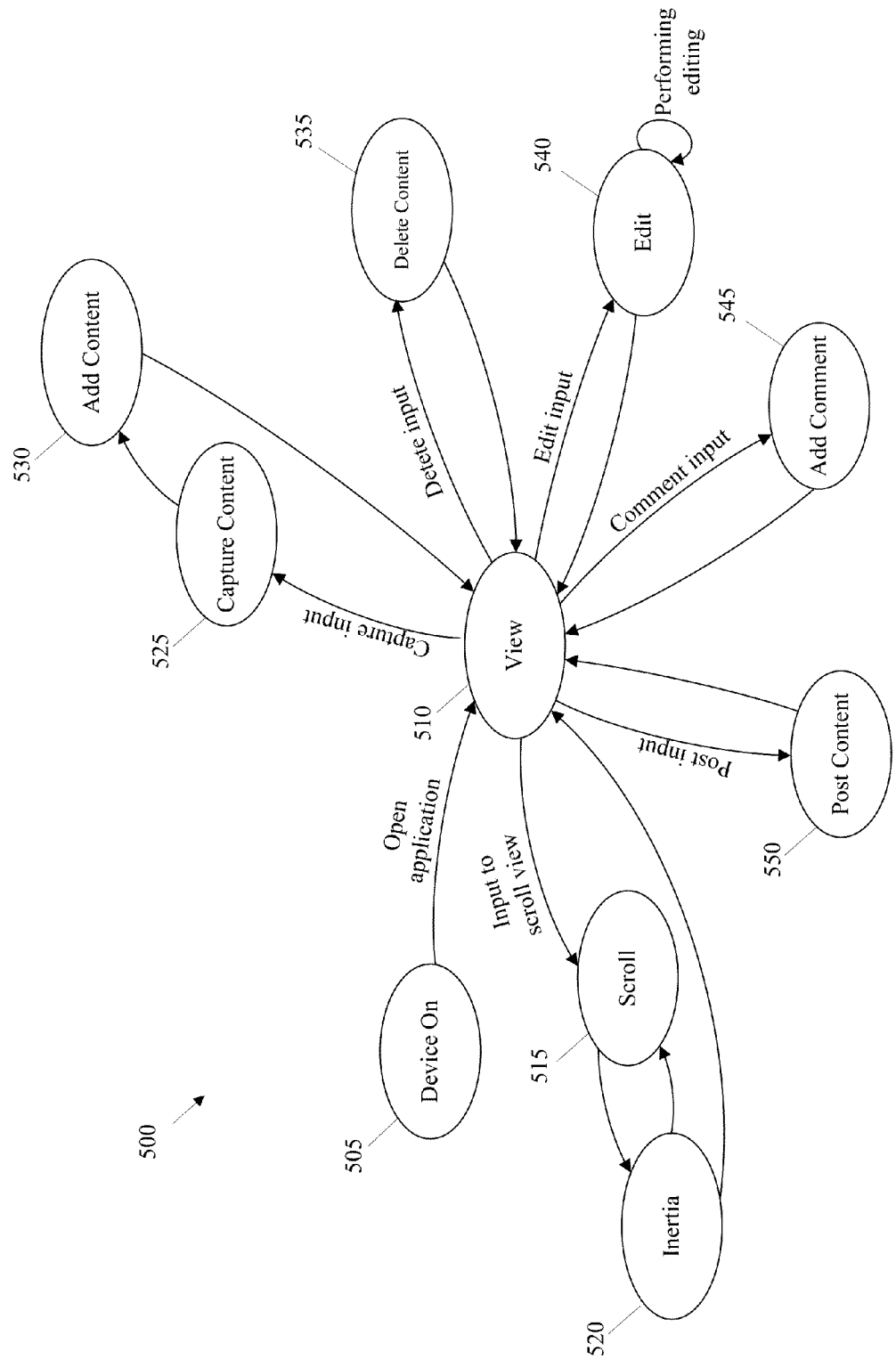
FIG. 5 presents a state diagram that illustrates the interactions between several processes of a device of some embodiments.

FIG. 5 presents a state diagram 500 that illustrates the interactions between several processes of a device of some embodiments that provides a single scrollable view with an in-line camera, a review portion, and a browsing portion. This figure shows ten states that collectively perform these operations. Each of the states represents a set of one or more processes for performing a subset of the operations. Some of these processes may be performed by processes associated with an application (e.g., a streaming application, a photo application), while other processes are device's OS level or lower level processes that the application uses to enable the scrollable view with the in-line camera.

The ten states are the device-on state 505, view state 510, scroll state 515, inertia state 520, capture content state 525, add content state 530, delete content state 535, edit state 540, add comment state 545, and post state 550. The device on state 505 represents the set of processes running on the device while the device is turned on. These processes in some embodiments include processes for handing various types of user input (e.g., an input to open an application), handling real-time communication received via a network, monitoring device usage to power down the device (e.g., in a sleep mode), etc.

In some embodiments, the device transitions from the device on state 505 to the view state 510 when the user inputs a command to open an application with the scrollable view. For example, if the device has a touch-sensitive screen, the user might tap on the device's touch screen display over the application icon. This in turn would cause the application to be opened. As mentioned above, the application of some embodiments is opened directly to the scrollable view. This allows the user to quickly take a picture or video, review it, and share it. All of these different tasks are achieved without navigating between different screens.

The view state 510 represents the set of processes running on the device while the device is showing the scrollable view with the in-line camera. The set of processes in some embodiments includes detecting various kinds of input on the scrollable view. For instance, a subset of the processes might detect whether there is an input to scroll between different portions of the view (e.g., the in-line camera, the review portion, and the browsing portion). Another subset of the processes might detect an input in the review portion to delete content, switch to editing mode, add comment, or post the image.

There can also be processes that detect input in the in-line camera portion and the browsing portion. For example, in the in-line camera portion, a subset of the processes might detect input to capture a video or take a picture, or detect input to change the camera settings (e.g., camera flash settings, zoom amount, focus settings, etc.). For the browsing portion, there can be sub-processes to detect selection of a representation of a piece of content. Such selection might cause the application to present a full-screen representation of the content and/or play the content. The browsing portion (as well as the review portion) may have sub-processes that handle how the media items arranged in that section (e.g., sorted by date, sorted by name, sorted by tags or markings, etc.)

When there is an input to scroll the view, the device transitions from view state 510 to the scroll state 515. In some embodiments, this transition can only occur when the view is scrollable. This might not always be the case as the view size of the scrollable view changes with the number of items that are shown in it. For example, when there are no content to review and no content in the content browsing section, the view might not be scrollable as it only shows the in-line camera. Screen real estate also factors into whether the view is scrollable. For example, a tablet device usually has a larger screen than a smart phone. Thus, the tablet could be used to take advantage of its screen size and display more media items.

The scroll state 515 represents the set of processes running on the device while the view is being scrolled. The scroll speed in some embodiments is based on the speed associated with the user input (e.g., how fast the user drags the user's finger on the touch sensitive-screen). In some embodiments, the device of some embodiments computes other variables to scroll the view. As an example, the device might have sub-processes to give the scroll residual motion when the user releases his or her finger from the drag. This residual motion can depend on the velocity or the speed of the finger movement. There can also be different sub-processes to smooth out the scrolling animation. All of these various sub-processes are represented by the inertia state 520.

When there is an input to take a video or a picture, the device transitions from the view state 510 to the capture content state 525. The capture content state 525 represents the set of processes running on the device while the device is capturing content. In some embodiments, one or more of the processes are operating system level or framework level processes that the application uses to take a video or a picture. In some embodiments, different processes react to different types of input differently. For example, one or more processes capture a picture when there is a single tap on the device's touch-sensitive screen over a particular affordance. Also, one or more processes capture a video when there is a push and hold gesture on the device's touch-sensitive screen over the particular affordance.

Once the content is captured, the device transitions from the capture content state 530 to the add content state 525. At this state 525, one or more processes executing on the device adds the content to the preview section. At the same state 525, one or more other processes might also catalog the content and add it to a collection database (e.g., a library or a camera roll database). For example, when a user takes a picture with an in-line camera, it can appear in multiple places, including the review area (also referred to as a preview section) and a collection area (e.g., a camera roll collection, a library) that shows all media content (e.g., video clips, images) that is associated with the device. In some embodiments, when the content is removed from the review area, the same content will not appear in the collection. That is, a sub-process might delete the content and the association such that its representation does not appear in the collection. Alternatively, when the content is removed from the review area, the device of some embodiments maintains the association and the content, and presents a representation of it in the collection. As shown in FIG. 5, upon adding the content, the device transition back to the view state 510.

When there is an input to delete content, the device transitions from the view state 510 to the delete content state 535. Here, the input is received at the review portion or the preview section. Accordingly, the delete content state 535 represents a set of processes that executes on the device to disassociate the content from the preview section. As mentioned above, the device of some embodiments does not delete the content but only removes it from the preview section. Upon deleting the content, the device transitions back to the view state 510.

When there is an input to edit content, the device transitions from the view state 510 to the editing mode state 540. In some embodiments, the input is received based on a preview content shown in the review section of the scrollable view. The state 540 represents a set of processes that executes on the device to edit the content. The loop in this state 540 shows that once an editing operation is preformed it returns to the same state (e.g., to receive additional edits). Different applications might provide different editing tools. Examples of such editing tools include different filters to enhance a photo or change its look (e.g., make it black or white, make it appear as if it is taken with a Polaroid camera, etc.), crop the photo, remove redeye from the photo, etc. For a video clip, the application might provide tools to trim the clip, apply a theme to the clip, combine it with another clip, add a title, etc.

When there is an input to add a comment, the device transitions from the view state 510 to the add comment state 545. In some embodiments, the input is received through a preview content in the review section of the scrollable view. The state 545 represents a set of processes that executes on the device to associate the content with a comment. Upon associating a comment, the device transitions back to the view state 510.

When there is an input to post a video or picture, the device transitions from the view state 510 to the post content state 550. In some embodiments, the input is received based on a preview content shown in the review section of the scrollable view. The state 550 represents a set of processes that executes on the device to post the preview content. In some embodiments, posting entails removing the representation of the content from the preview section and adding a representation to the content browsing section. There can also be one or more processes to share the content. In sharing content, one or more processes might generate different versions of the content. For example, a video clip may be converted or transcoded to different lower-resolution versions so that the video upload consumes less bandwidth. The conversion can also depend on a website (e.g., a third-party website). For example, a video sharing website might not accept videos that are a certain frame rate or bitrate.

In conjunction with sharing to a website or instead of it, the device of some embodiments executes a set of processes to distribute the content to the user's other devices and/or devices of other people. In some embodiments, the set of processes communicate with a set of ubiquitous servers to distribute the content to other devices. For example, when a new content is posted, the device might send a set of messages to a ubiquitous server (e.g., a control server) regarding a new-posted content. The ubiquitous server might then respond with a set of one or more URLs to upload the content. The set of URLs may be for a storage server that stores the content. The device would then upload the content to the storage server using the set of URLs. The ubiquitous server in some embodiments checks its database to determine which other devices should have a copy of that content, and send each one of those devices a set of messages regarding the new content and the set of URLs to download the content. Each device would then download the content using the set of URLs. In some embodiments, the ubiquitous server identifies the other user devices based on the device's association with the user (e.g., the user account). In some embodiments, the ubiquitous server identifies other devices based on each user that has subscribed to (user account associated with) a shared photo stream album and the device's association with the user.

One of ordinary skill in the art will realize that the state diagram 500 simplifies the operation of the device for purposes of the highlighting the scrollable view. Other states of the device are not shown in this diagram. For instance, this diagram does not show various different background tasks that could be executing on the device.

II. Capturing Content with the In-Line Camera

As mentioned above, the scrollable in-line camera of some embodiments is a real-time media capture tool that provides a user with the ability to capture media content in real-time. The in-line camera includes a preview area that displays in real-time a scene from a vantage point of the device's camera. The in-line camera also includes a set of tools that can be used to take a picture or a video of that scene. Several examples of capturing media data with the in-line camera will now be described below by reference to FIGS. 6-7.

Figure 6:
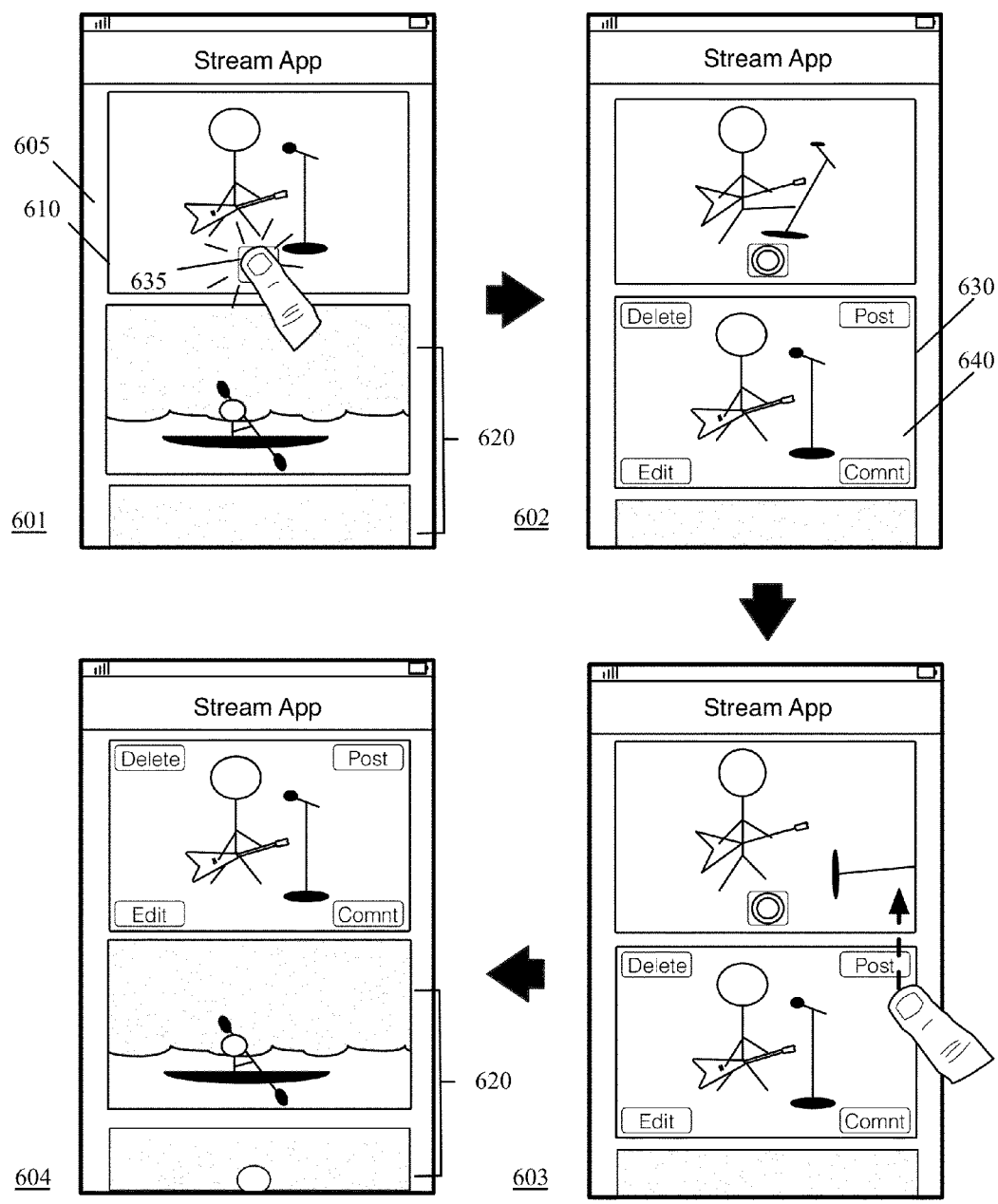
FIG. 6 provides an illustrative example of capturing content with an in-line camera.

FIG. 6 provides an illustrative example of capturing content with an in-line camera. Specifically, this figure illustrates in four different stages 601-604 how a user can utilize a single scrollable view 605 to (1) capture a photo with in-line camera, (2) preview the photo, and (3) browse through other photos.

In the first stage 601 of FIG. 6, the scrollable view 605 has been scrolled to a position that shows the in-line camera in its entirely. In this example, the in-line camera occupies the first position on the scrollable view. As the view 605 scrolls up and down, the first position is the top-most position. The first position may be a left-most position when the view scrolls side-to-side in some embodiments. The first position may be a top-left most position if the view can be scrolled in both vertically and horizontally.

As shown in the first stage 601, several representations of different photos are shown beneath the in-line camera. These photos represent the ones that are a part of the content browsing section. This first stage 601 also illustrates that the scrollable view does not have a preview section for reviewing content captured with the in-line camera. This is because the user has not used the in-line camera to take a picture or video, or each piece of content captured with the in-line camera has been reviewed (e.g., accepted or deleted).

The first stage 601 illustrates that the viewing area 615 of in-line camera 610 is now displaying a real-time view of a scene. The in-line camera is also associated with an affordance (e.g., a selectable button 635) to take a picture or video of that scene. In the first stage, the user takes a picture of the scene by selecting (e.g., by performing a gesture such as tapping the user's finger on) the button 635.

The second stage 602 illustrates the scrollable view 605 after a picture has been taken with the in-line camera. As shown, this action caused the scrollable view to dynamically expand in order to add a new preview section. In this example, the new preview section 630 is displayed in a second position of the scrollable view, the second position being underneath the first in-line camera section 610. The preview section includes the preview tools (e.g., the post, edit, comment, and delete buttons), which were discussed above by reference to FIG. 1. Additional details regarding these tools will be described in Section III below.

In the next stage 603, the user is scrolling up the scrollable view 605 (e.g., by dragging the user's finger up on the device's touch-sensitive screen) in order to view the third content browsing section of the scrollable view. As described before, scrolling up and down the scrollable view will result in having access to the different sections of the scrollable view of an integrated application of some embodiments.

The fourth stage 604 illustrates that scrollable view after receiving the user input. Specifically, the in-line camera has been scrolled out of the view. The scrollable view 605 now displays all of the preview section 630 and a portion of the content browsing section 620. Although not shown in this figure, one of ordinary skill in the art would realize that further scrolling of the scrollable view upward would result in more content of the content browsing section being displayed by the application until the application reaches the last media content of the stream.

As mentioned above, the layout and size of the various sections (e.g., the in-line camera section, the preview section, the content browsing section) can change from one GUI to another. For instance, the in-line camera section of the scrollable view in FIG. 1 covers almost the whole display area of the device, while the size of the in-line camera section of FIG. 6 is equal to the size of the other windows presenting the preview section and content browsing section of the scrollable view.

In the examples that are illustrated so far, the preview section of the scrollable view show one content to review. In some embodiments, the preview section expands to include additional content each time the in-line camera is used to capture a new content and the old content has not been accepted or rejected by the user. For example, a user might not interact with the preview section to accept or reject a photo immediately after capturing it. Rather, the user might continue taking additional photos. Once the user is finished taking photos, he or she might then decide to accept or reject each photo.

Figure 7:
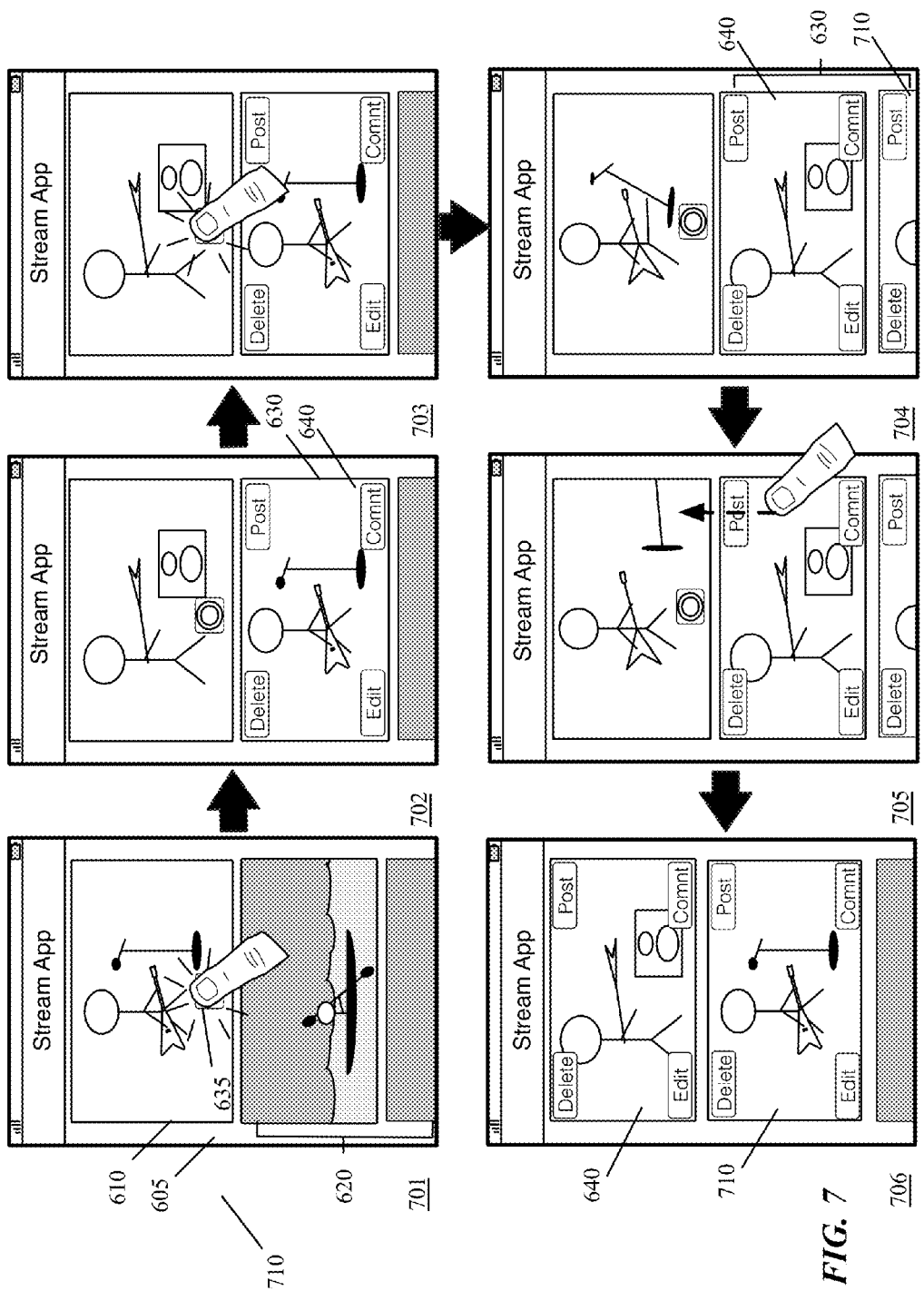
FIG. 7 provides an illustrative example of how the preview section expands to display each additional photo captured with the in-line camera.

FIG. 7 provides an illustrative example of how the preview section expands to display each additional photo captured with the in-line camera. Six operational stages 701-706 of the smart phone are illustrated in this figure. The first two stages 701 and 702 are similar to the first two stages of the previous figure. Specifically, in the first stage, the user is taking a picture by selecting the button 635 of the in-line camera. The rest of the scrollable view is dedicated to the content browsing section 620. The second stage 702 illustrates that a new preview section 630 is created in the scrollable view 605 underneath the first in-line camera section 610. The newly generated preview section includes the captured image 640.

The third stage 703 shows that the user instead of interacting with the preview section 630 has decided to take another picture. This stage shows that the user has selected the button 635 (e.g., by performing a gesture such as tapping the user's finger on the button) one more time and has taken a second different picture of the guitar player.

In the fourth stage 704, as the result of taking the second picture, the preview section of the scrollable view has been expanded to cover both preview images 640 and 710. Although, only a portion of the second image 710 is displayed in the display area at this stage (because there is no more space in the display area to show all the images at the same time). However, since the scrollable view of some embodiments is scrollable, a user may easily navigate through each section as well as between the sections of the scrollable view.

The fifth stage 705 shows the same display area as the one shown in the previous stage with the exception that in this stage the user is scrolling the scrollable view up by using a touch gesture (e.g., moving or dragging the user's finger up on the device's touch-sensitive screen) in order to view other content in the display section including any remaining content in the preview section.

The sixth and last stage 706 illustrates that now both images 640 and 710 of the preview section are being displayed in the display area of the device. As illustrated in this stage, each image has its own four buttons for posting the image, deleting the image, editing the image, and/or associating comments with the image. This stage also illustrates that a small portion of the content browsing section 620 of the scrollable view is displayed as the result of the scroll. Of course, the other content of the content browsing section will be viewable upon further scrolling of the scrollable view 605.

III. Preview Tools

Having described an example of first portion (i.e., in-line camera section) of the scrollable view, the second portion (i.e., preview section) of the scrollable view will now be described in this section. As described above, the preview section of the scrollable view will be displayed automatically after capturing a new content. In some cases, the user has to scroll down the scrollable view to the preview section after capturing the content in order to interact with the preview section. When there is no content to be reviewed, the scrollable view may not include a preview section. The application of some embodiments, upon capturing a new content, automatically generates and adds a preview section next to (e.g., underneath, the right of) the in-line camera section. The application of some embodiments would add any additional captured content to this section until the user either delete the content or post the content in order to share the content.

The preview section of some embodiments includes a preview display area to review a media content and a set of tools to either accept or reject the media content. The preview section may also include other tools for leaving a comment regarding the content and/or ending the content. The following Subsections A-D will describe each of these controls in more detail.

A. Deleting

Figure 8:
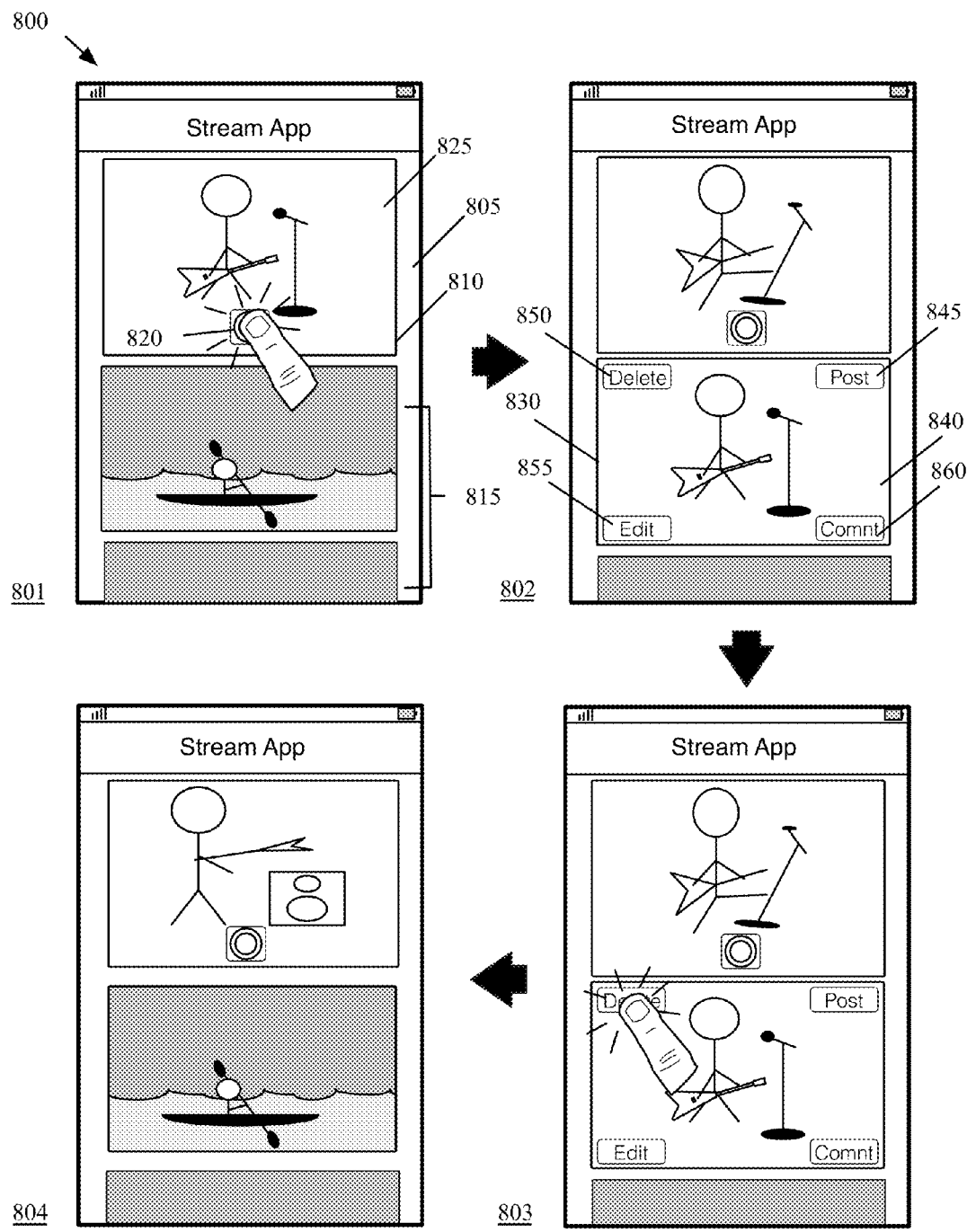
FIG. 8 illustrates an example of using a preview section of a scrollable view to delete a photo captured with the in-line camera.

FIG. 8 illustrates an example of using a preview section of a scrollable view to delete a photo captured with the in-line camera. Four operational stages 801-804 of the GUI 800 are shown in this figure. The first stage 801 illustrates the GUI 800 displaying two different sections of the scrollable view 805, namely an in-line camera section 810 and a content browsing section 815. The first stage also illustrates that a user is taking a picture with the in-line camera.

The second stage 802 illustrates the scrollable view 805 after a picture has been taken with the in-line camera. As shown, this action has caused the scrollable view to dynamically expand in order to add a new preview section. In this example, the new preview section 830 is shown underneath the in-line camera section (as the result of capturing the image displayed in the viewing area 825).

As shown in the second stage 802, the preview section 830 includes a preview display area 840 that displays a representation of the picture captured with the in-line camera. Overlaying this area are several affordances including the affordances to accept or reject the captured content. Here, the affordances are post and delete buttons 845 and 850. The delete button can be used to delete the content displayed in the preview section. The post button can be used to accept the content. Once accepted, the content may be published across the user's device and/or published to one or more devices of other users. Alternatively, the content may be posted to a website so that a group of people can view it.

In some embodiments, the preview section 840 provides other affordances to edit the content and/or leave a comment regarding the content. This is shown in FIG. 8 by the preview section including an edit button 855 and a comment button 860. The edit button 855 and comment button 855 are other examples of how the application of some embodiments allows a person to accomplish multiple different tasks in one scrollable view. For example, the user can take a picture, edit the picture, leave a comment regarding the picture, and then post the picture, all in this one scrollable display area screen.

In the third stage 803, the user selects the delete button 835 (e.g., by performing a touch gesture such as tapping the user's finger on the button). As shown in the fourth stage 804, the selection causes the preview picture to be removed from the scrollable view. In addition, as there are no content to review, the scrollable view does not include a preview section between in-line camera section 810 and the content browsing section 815. The spot that was occupied by the preview section is now occupied by a portion of the content browsing section 815.

As described previously, upon capturing a new content, besides adding the content to the preview section, the application of some embodiments automatically adds the content to a media library of the device (e.g., a camera roll display area). In some embodiments, selection of the delete button removes the content from the preview area only. In some embodiments, however, selection of the delete button will delete the content from both the preview section of the scrollable view and the media library (e.g., camera roll).

B. Editing

The edit button in some embodiments can be used to initiate an editing operation on the displayed content. That is, when the button is selected, the application might provide a set of editing tools to edit the content. Different applications might provide different editing tools. Examples of such editing tools include different filters to enhance a photo or change its look (e.g., make it black or white, make it appear as if it is taken with a Polaroid camera, etc.), crop the photo, remove redeye from the photo, etc. For a video clip, the application might provide tools to trim the clip, apply a theme to the clip, combine it with another clip, add a title, etc.

Figure 9:
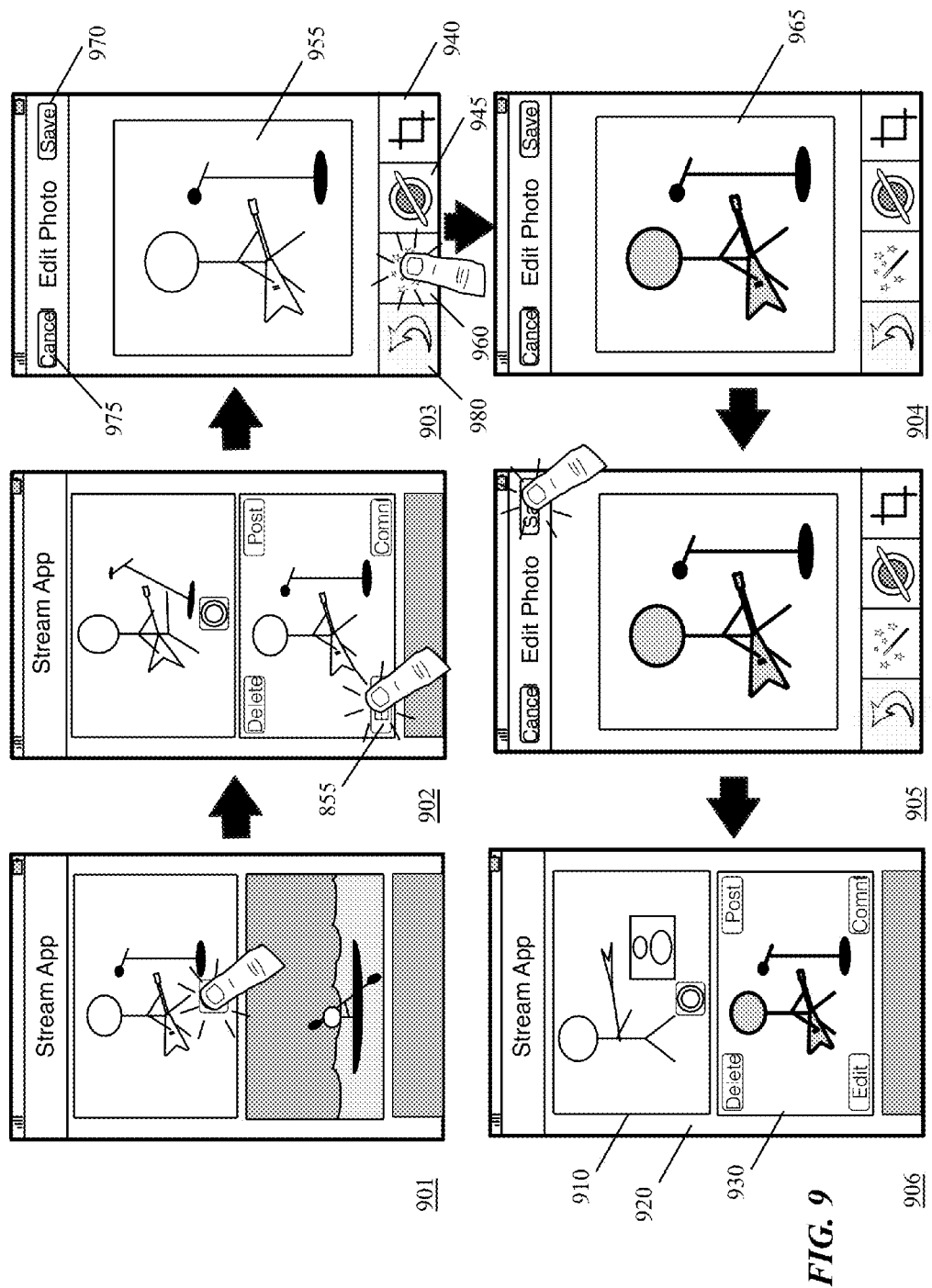
FIG. 9 illustrates an example of using the preview section of a scrollable view to edit a photo captured with the in-line camera.

FIG. 9 illustrates an example of using the preview section of a scrollable view to edit a photo captured with the in-line camera. Six operational stages 901-906 of the GUI 900 are shown in this figure. The first two stages 901 and 902 of this figure are similar to the ones shown in the previous figure. Specifically, the first stage 901 illustrates taking a picture with the in-line camera. The second stage 902 shows that a representation of the picture has been added to the preview section. The preview picture is shown with the post, delete, comment, and edit buttons. To edit the picture, the user selects the edit button 855 from the preview section.

In some embodiments, the selection of the edit button 855 causes a media editing application to be opened. The media editing application may also present the captured image in its display area so that it can be edited. Instead of opening a separate application, the selection of the edit button might cause the application with the scrollable view to display several editing tools. In the example of the second stage, the selection of edit button causes (1) the preview picture to be shown in the display area 955. Different from the scrollable view, this display area 955 only displays the preview image. The preview image is shown with several editing tools, namely a save button 970 to apply edits to the image, and a cancel button 975 to cancel the editing operation. Selecting the cancel button may result in the display of the scrollable view, as illustrated in the second stage 902.

In the example illustrated in FIG. 9, the editing tools includes a rotate tool 980 for rotating the picture, an enhance tool 960 for enhancing the picture, a red-eye removal tool 945 for removing red-eye from the faces in the picture, and a crop tool 940 for cropping the picture. As mentioned above, different applications might provide different editing tools. Examples of other editing tools include various filters to change the appearance of the content (e.g., make the photo black or white, make the photo appear as if it is taken with a polaroid camera, make the photo more vibrant, add a tint to the photo, etc.). For a video clip, the application might provide tools to trim the clip, apply a theme to the clip, combine the clip with another clip, add a title to the clip, etc.

In the third stage 903, the user selects the enhance button 960 to enhance the picture 955 and generate a new enhanced picture 965. The fourth stage 904 shows a preview of the picture after it has been enhanced. The enhancement is depicted in the fourth stage 904 as the guitar player and the guitar has changed from being white to grey. Also, each person or object in the picture is shown with a thicker line in the fourth stage 904 as opposed to the third stage 903.

The fifth stage 905 illustrates that the user is now selecting the "save" button 970 in order to save the changes to the image. The sixth stage 906 shows that the display screen of the device is now displaying the scrollable view 920 again with the in-line camera section 910 at the top of the display area and the preview section 930 at the bottom. However, the preview section at this stage displays the enhanced version of the photo 955 instead of the original captured photo.

C. Commenting

Figure 10:
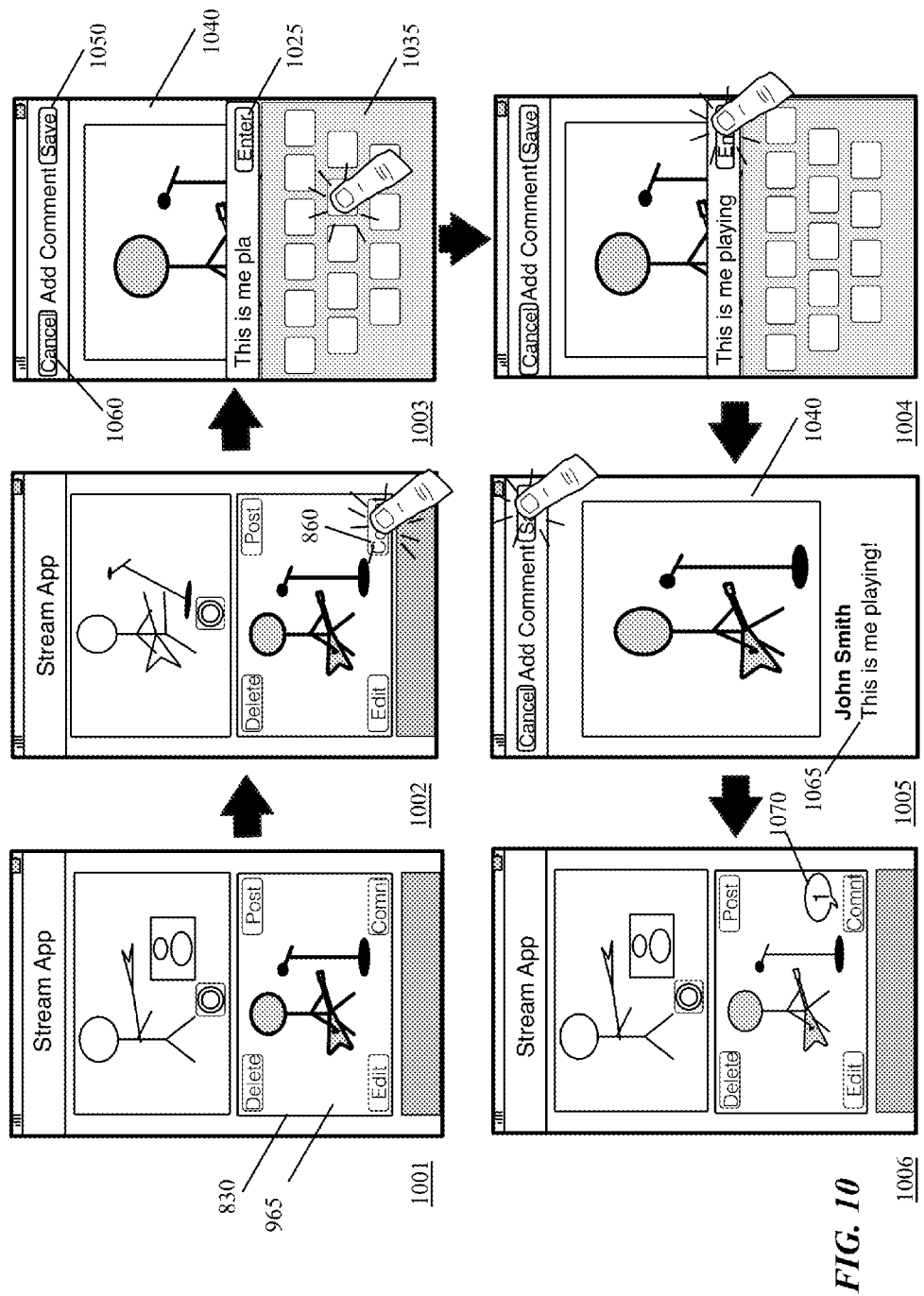
FIG. 10 illustrates an example of using the preview section to associate a comment with a photo captured by the in-line camera.

FIG. 10 illustrates an example of using the preview section to associate a comment with a photo captured by the in-line camera. This figure shows a series of operational stages 1001-1006. These stages are a continuation of the ones illustrated in the previous figure. The first stage illustrates the preview section showing the enhanced photo 965. In the second stage 1002, to associate a comment with the photo, the user selects the comment button 860 from the preview section 830.

As shown in the third stage 1003, the selection of the button causes an on-screen or virtual keyboard 1035 to appear over display area 1040. Different from the scrollable view, this display area 1040 only displays the preview image. The preview image is also shown with a save button 1050 to save the comment and a cancel button 1060 to return to the previous view (e.g., the scrollable view) without entering a comment. In the fourth stage 1004 the user has finished entering the comment using the on-screen keyboard. The user then selects the enter button 1025 to enter the comment.

The fifth stage 1005 shows the display area 1040 after entering the comment. As shown, the comment 1065 now appears with the picture in the display area 1040. The comment also includes the name of the person that is leaving the comment. In this case, that person is the owner of the smart phone. In the fifth stage 1005, the user selects the save button 1050 to save the comment.

The sixth stage 1006 illustrates the preview section 830 after the picture has been associated with the comment. The picture is now displayed with a marking 1070 that indicates that it is associated with a comment. In this example, the marking is a comment bubble that includes a number that identifies the number of comments associated with the picture. In conjunction with the marking or instead of it, the preview section of some embodiments may display the picture with its associated comment. Additionally, selection of a comment bubble of a picture in some embodiments, results in the display of all associated comments with the picture.

In some embodiments, when the content is associated with a comment and a person selects the post button, the preview content is published to a website (e.g., a third-party website) with the associated comment. In other words, people can view the content in a webpage with that associated comment. In some embodiments, the content and its associated comment are pushed to one or more devices of different users. Once pushed, each device presents the content with the associated comment.

D. Sharing

Figure 11:
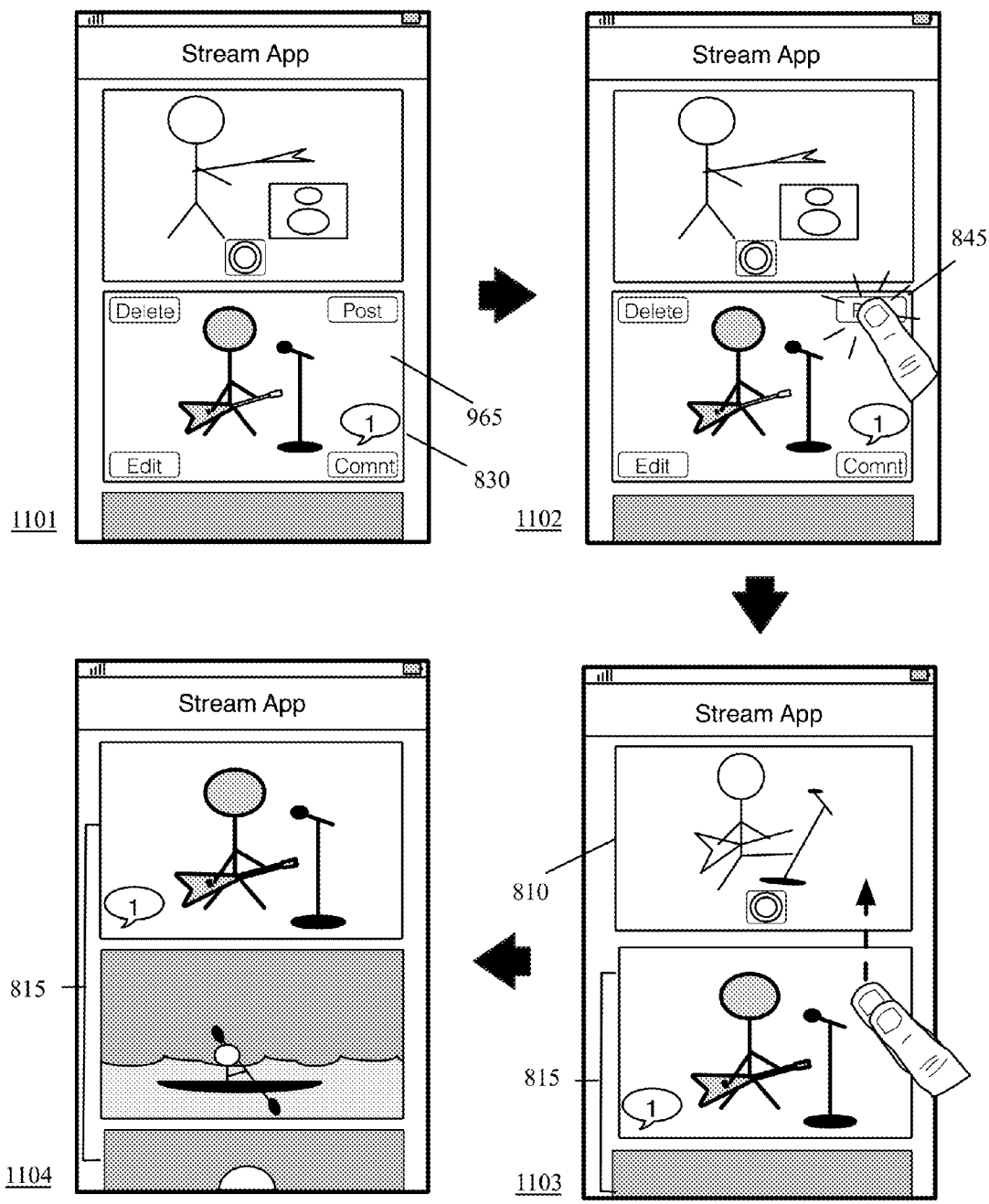
FIG. 11 illustrates an example of using the preview section to share a content that is captured with the in-line camera.

FIG. 11 illustrates an example of using the preview section to share a content that is captured with the in-line camera. This figure shows a series of operational stages 1101-1104 that are a continuation of the ones illustrated in the previous figure. The first stage 1101 illustrates the preview section showing the enhanced photo 965. The first stage also shows that a comment is associated with the enhanced photo. In the second stage 1102, to post and share the enhanced photo with its associated comment, the user selects the post button 845 from the preview section 830.

The third stage 1103 illustrates the result of the selection of the post button 845. As shown in the fourth stage 1104, the selection causes the preview picture to be removed from the scrollable view. In addition, as there are no content to review, the scrollable view does not include a preview section between in-line camera section 810 and the content browsing section 815. The spot that was occupied by the preview section is now occupied by a portion of the content browsing section 815. This stage 1103 also shows that the user is scrolling up the scrollable view (e.g., by dragging the user's finger up on the device's touch-sensitive screen) in order to view other contents of the content browsing section. The fourth stage 1104 illustrates that 965 now appear in the content browsing section 1125.

IV. Photo Stream Album Browser

Adding a new content (e.g., photo, video, etc.) to the content browsing section of some embodiments was described in the previous section. Additionally, as described above, the application of some embodiments utilizes the content browsing section as a shared stream. The shared stream might represent a streaming album. The contents of a streaming album might be distributed across to each device of one or more people that are associated with (e.g., that has subscribed to) the streaming album. The application of some embodiments, distributes the content of the shared stream album only across different devices of the user.

In some embodiments, however, there are one or more stream albums and each album has its own characteristic. For instance, each different stream album can be shared among a different group of people (e.g., people who have subscribed to the album). The application of some embodiments allows other users to edit the contents of a shared stream album while in some embodiments no other user is allowed to edit the content. In other words, the owner of a shared stream album may define different access privileges for different people who have access to the stream album.

Figure 12:
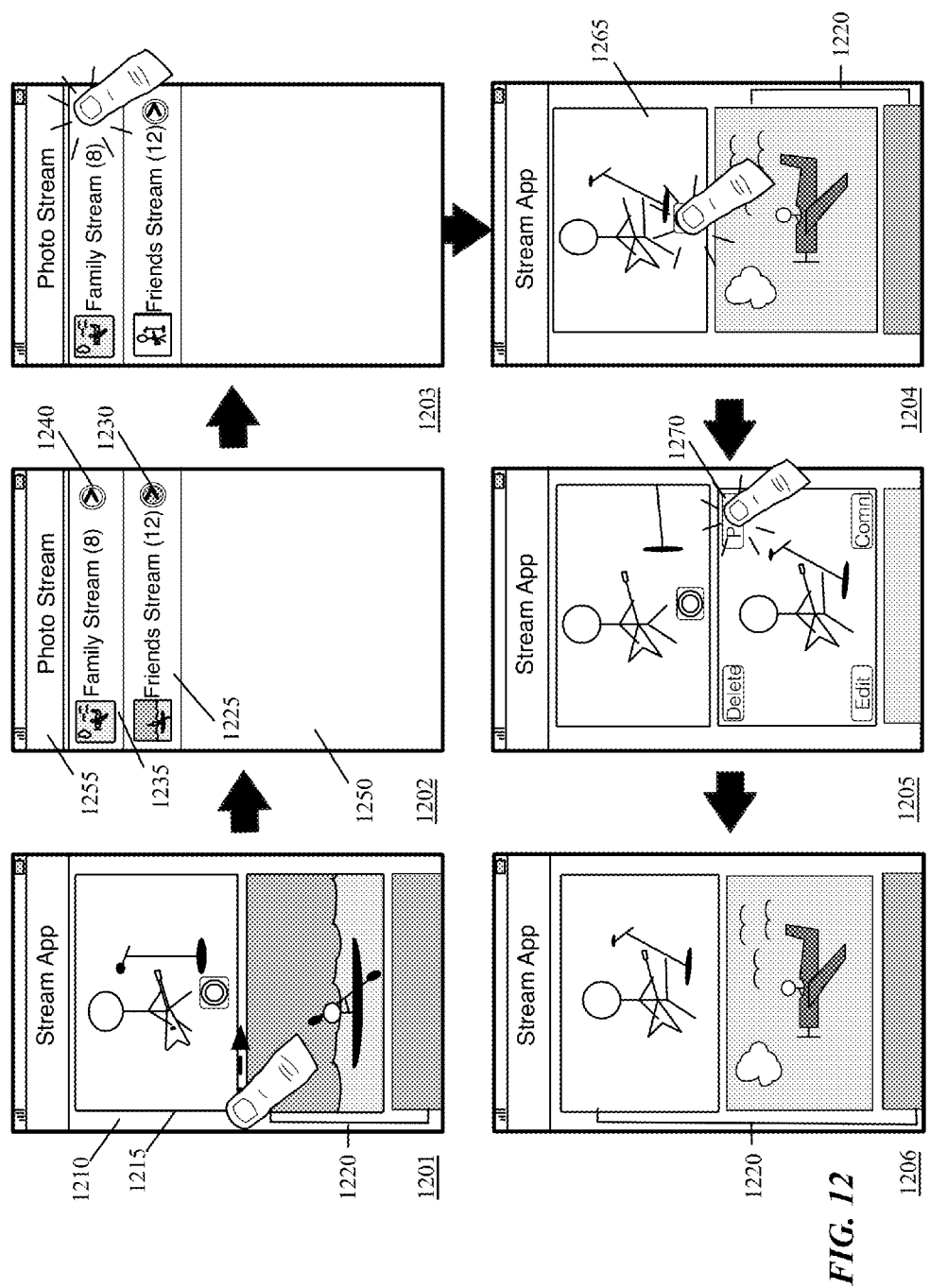
FIG. 12 provides an example of how the application of some embodiments allows a user to change the content of the browsing section from one shared stream album to another.

The application of some embodiments, therefore, utilizes one or more different shared stream albums as the third browsing section of the scrollable view. FIG. 12 is an example of how the application of some embodiments allows a user to change the content of the browsing section from one shared stream album to another. Specifically, this figure illustrates through six operational stages 1201-1206 changing of the third section (i.e., content browsing section) of some embodiments from a first stream album to a second stream album. The GUI 1200 of FIG. 12 includes a scrollable view 1210. The first stage 1201 illustrates that the GUI 1200 presently consists of two different sections, the in-line camera section 1215 and the content browsing section 1220.

The content browsing section of the scrollable view in this figure is currently utilized to include the contents of a shared photo stream (e.g., "Friends Stream," illustrated in the second stage 1202). In other words, addition of any content (e.g., photo, video, etc.) to the content browsing section through the preview section would result in insertion of that content to the corresponding shared photo stream. Similarly, modifications (e.g., deletion, edition, etc.) of the contents of the shared photo stream would result in the same modifications on the contents of the corresponding content browsing section of some embodiments.

The scrollable view 1210 is a scrollable view through which a user could scroll up, down, left, and right. As discussed earlier, a user may navigate between different sections of the scrollable view as well as different contents of the same section (i.e., preview section and content browsing section) by vertically scrolling the scrollable view. However, in some embodiments, a user may scroll the scrollable view horizontally in order to switch between stream library and the streaming application. Returning to stage 1201 of FIG. 12, this stage also shows that a user is scrolling the scrollable view to the right (e.g., by moving or dragging the user's finger to the right on the device's touch-sensitive screen) in order to change the current stream, the content of which is displayed in the browsing section, to another stream. The second stage 602 illustrates the result of the selection of the button 635 in the first stage. As shown, a new preview section 630 for the scrollable view 605 is created underneath the first in-line camera section 610, which includes the captured image 640 along with four buttons for posting the image, deleting the image, editing the image, and writing comments on the image. These buttons were briefly described in FIG. 1 and will be describe again in more detail in the next section (i.e., preview section).

The second stage 1202 illustrates the GUI 1200 now displaying a photo stream application 1255. The photo stream application's main display area 1250 includes two different streams 1225 ("Friends Stream") and 1235 ("Family Stream"). This stage also illustrates that the arrow sign 1230 next to the stream 1225 is highlighted while the other arrow sign 1240 is not highlighted. The highlighted arrow 1230 is an indication that the stream 1225 ("Friends Stream") is currently the stream that is associated with content browsing section 1220. In other words, addition of any new content to the content browsing section would cause the same content to be added to the Friends Stream 1225. The stage 1202 additionally shows that the stream 1225 includes twelve contents while the other stream 1235 holds eight contents. Moreover, each stream has its own thumbnail representation. The thumbnail representation of a stream in some embodiments is the first image of the stream while in some embodiments the thumbnail representation is the last image of the stream. Yet in other embodiments, the thumbnail representation is a random image of the stream.

The third stage 1203 illustrates the same GUI 110 of the second stage with the exception that at this stage, the user has selected the stream 1235 (e.g., by tapping on the stream 1235 or on the arrow sign 1240) in order to replace the stream 1225 with the stream 1235. As shown in this stage, the right arrow sign 1230 is not highlighted anymore. By switching the streams, the application of some embodiments cuts off the association of the old stream with the content browsing section and establishes a new association between the newly selected stream and the content browsing section.

The fourth stage 1204 illustrates that similar to the first stage, the application is displaying the in-line camera section 1215 and the content browsing section 1220. However, the content browsing section at this stage includes different contents than the content browsing section of stage one because this section of the scrollable view now includes the contents of the Family Stream 1235 instead of the Friends Stream 1225. The stage 1204 also illustrates that the user has selected button 1260 in order to capture the image 1265 which is the current image displayed in viewing area of the in-line camera 1215.

The fifth stage 1205 shows that as the result of capturing the image 1265, the application now displays the second section of the scrollable view 1210 (i.e., the preview section"). The fifth stage also shows that the user has selected button 1270 (e.g., by performing a gesture such as tapping the user's finger on the button) in order to post the captured picture 1265 from the preview section to the content browsing section 1220 of the scrollable view 1210. As discussed before, addition of the image 1265 to the content browsing section in some embodiments would result in sharing this image with all of the users that are allowed to share the Family Stream 1235 with the user.

The sixth stage 1206 illustrates that as the result of selection of the post button 1270, the application now displays the second section of the displays the newly added photo 1265 at the beginning of the content browsing section 1220. Although not displayed in this figure, the image 1265 is also added to the associated stream 1235 thus all the limitations and configuration of stream 1235 would now apply on this image.

V. Alternative Embodiments

Figure 13:
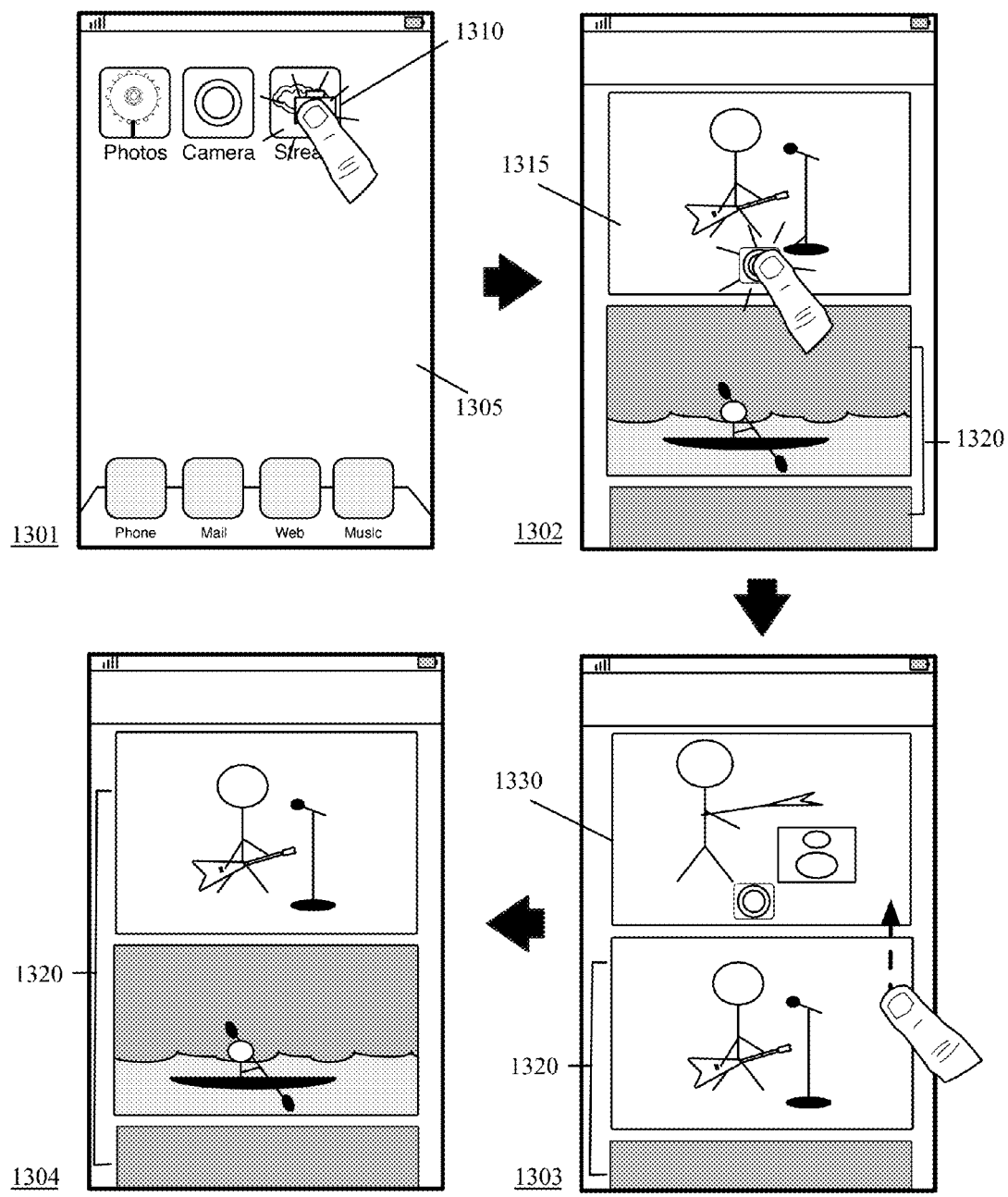
FIG. 13 illustrates how a piece of content can be captured and shared through a two-step approach.
Figure 14:
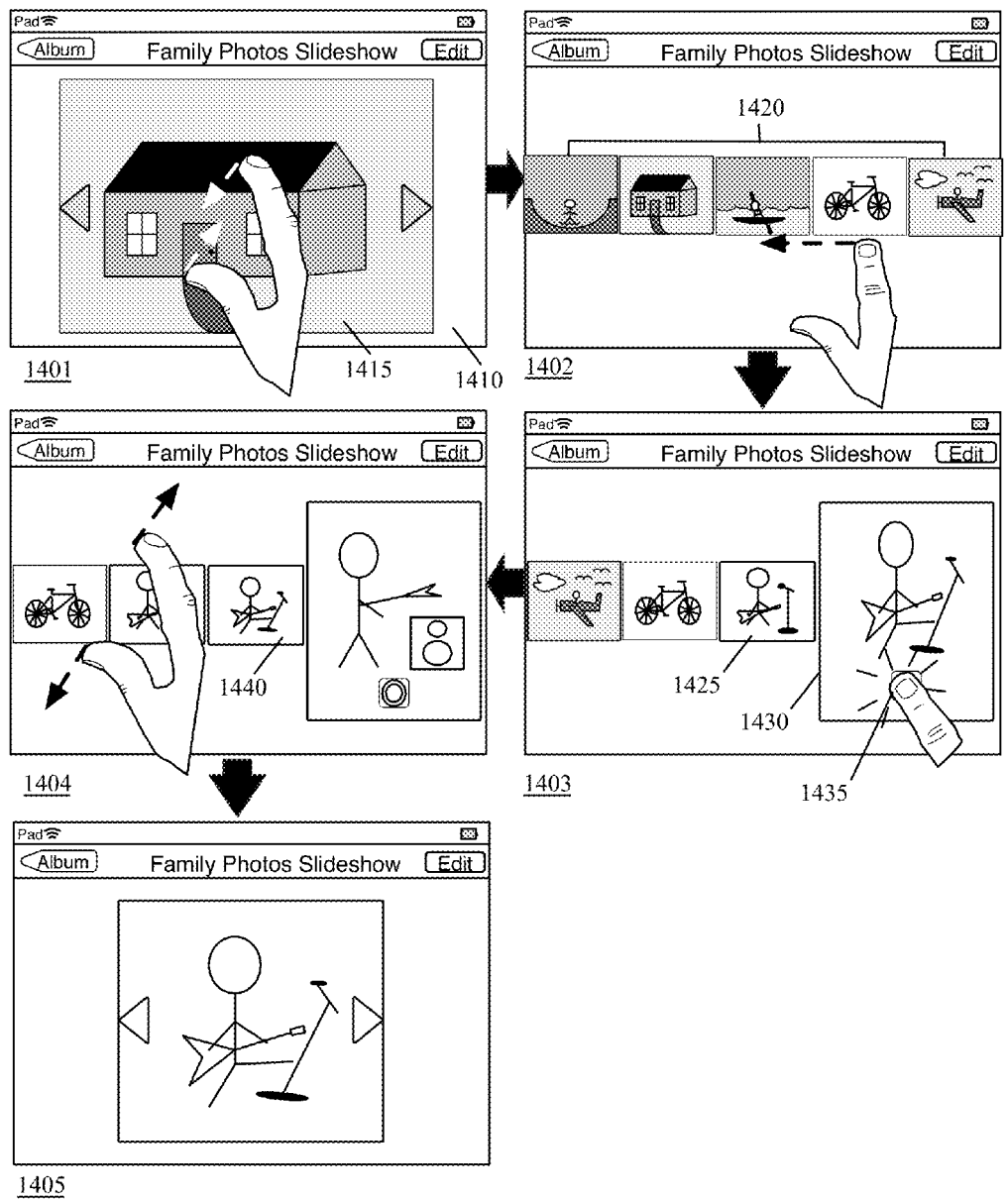
FIG. 14 provides an illustrative example of using the scrollable view to take a picture and add it to a slide show presentation.

Several alternate embodiments will now be described below by reference to FIGS. 13 and 14. Specifically, FIG. 13 illustrates how a piece of content can be captured and shared through a two-step approach. FIG. 14 then provides an illustrative example of using the scrollable view to take a picture and add it to a slide show presentation.

A. Two-Step Approach

In FIG. 2 above, a simple three-step approach in order to post content to the browsing section (and its associated shared stream library) was described. More specifically, FIG. 2 illustrates that a user first opens the application of some embodiments by selecting a user selectable item representing the application. The user then captures the content through the in-line camera section of the scrollable view. Finally, the user posts the captured content through the preview section to the content browsing section of the scrollable view.

FIG. 13, on the other hand, is an example of one alternative embodiment. More specifically, FIG. 13 illustrates through four operational stages 1301-1304 a two-step approach to capture and post content. In other words, this figure illustrates that in an alternative embodiments, by removing the preview section from the scrollable view, the application posts the content to the content browsing section immediately upon capturing the content.

In this Figure, the device is a smart phone with a touch-sensitive screen. As shown, the touch-sensitive screen displays a home screen page on which application icons can be arranged. The home screen page is overlaid by a dock on which the icons of several key applications (e.g., phone, e-mail, browser and music applications) can be arranged. Through this home screen page 1305, a user can touch-select an application icon to open or switch to a previously opened application, or can make other gestures to navigate between the pages of the device.

The first stage 1301 illustrates the first step in the two-step approach, which is opening the application with the in-line camera. Specifically, the home screen page 1305 displays the application's icon. To open the application, the user selects the icon 1310 by tapping the user's finger over it on the touch-sensitive screen. The selection causes the application to be opened, as illustrated in the second stage 1302.

The second stage 1302 illustrates that the application has been opened to a scrollable page with the in-line camera.

This is important because the application's user does not have to make a subsequent selection to direct the application navigate to another page with the in-line camera. The second stage 1302 illustrates the second and final step in the two-step approach, which is taking a picture with the in-line camera. Specifically, the in-line camera shows a scene from a vantage point of the device's rear-facing camera. The scene includes a person that is playing a guitar. To take a picture, the user taps the user's finger on the touch screen display over the button 150. The touch gesture causes the device to take a snapshot of the scene that is displayed in the in-line camera section.

The third stage 1303 illustrates the streaming application after taking the picture. As illustrated at this stage, the captured image 1315 has been directly added to the content browsing section 1320 of the scrollable view underneath the in-line camera section 1330. This stage also illustrates that the user is scrolling the scrollable view up by using a touch gesture (e.g., moving or dragging the user's finger up on the device's touch-sensitive screen).

The fourth stage 1304 illustrates that as the result of scrolling up the scrollable view the streaming application now displays the content of the content browsing section in the display area with the image 1330 being on top of the other contents of the browsing section. Although not displayed in this figure, one of ordinary skill in the art would realize that further scrolling of the scrollable view would result in more content being displayed by the application until the application reaches the last shared media content.

B. Slide Show

The application of one alternative embodiment allows a user to capture new content and add the newly captured content to a slide show while the user is viewing the slide show. In some embodiments, the application provides, upon using a particular affordance or through a particular hand gesture of the user, a scrollable in-line camera at the end of the slide show along with other contents of the slide show. The user then will be able to capture new media content (e.g., a photo) and the application will automatically add the newly captured content to the slide show (e.g., to the end of the slide show) immediately after capturing the content. FIG. 14 is an example of such an alternative embodiment.

FIG. 14 illustrates, through five operational stages 1401-1405, capturing and adding a media content to a slide show in real time through a scrollable in-line camera of some embodiments. In this figure, the device is a tablet with a touch-sensitive screen. As shown in the first stage 1401, the display area 1410 of the touch-sensitive screen of the device displays an image 1415 as part of a slide show. Image 1415 belongs to the Family Photos library along with a series of other photos. The first stage 1401 also illustrates that the user, through a specific hand gesture over the display area 1410 (e.g., pinching the screen with the thumb and index finger), is indicating that he or she desires to add a real-time picture to the Family Photos slide show.

The second stage 1402 illustrates that a set of thumbnail images 1420 that represent the photos of the slide show are displayed in the display area 1410 as the result of the pinching gesture. This stage also illustrates that the user is scrolling the screen to the left (e.g., by moving or dragging the user's finger towards left on the device's touch-sensitive screen). In some embodiments, the user has to keep scrolling the screen leftward until the application reaches the last thumbnail representation of the slide show.

The third stage 1403 shows that the user has reached the last thumbnail 1425 in the slide show, and immediately after the last thumbnail, an in-line camera 1430 is now displayed. The scrollable in-line camera shows a scene from a vantage point of the device's rear-facing camera. The scene includes a person playing a guitar. In this stage, the user selects the button 1435 in order to capture the picture of the guitar player with the in-line camera 1430.

The fourth stage 1404 illustrates that a thumbnail 1440 representing the captured image from the previous stage is added to the end of the series of the thumbnails and the in-line camera now shows a different scene. Although the thumbnail 1440 is added to the end of the thumbnails in this figure, in some embodiments, the newly captured image is added to the beginning of the slide show. In some embodiments, the newly captured image is added immediate after the last image that the user was viewing before invoking the in-line camera. The fourth stage also illustrates that the user, through a different hand gesture (e.g., moving the thumb and index finger in opposite directions), is indicating that he or she wishes to return to the slide show and continue on watching the photos in the Family Photos slide show.

Finally, the fifth stage 1405 shows that as the result of the user's hand gesture in the previous stage, the display area 1410 is now displaying the captured picture in the slide show format. As stated above, although in this stage, the last captured image is the first photo that appears in the slide show, the application of some embodiments starts the slide show all over again while the application of some embodiments starts the slide show from the last image before invocation of the in-line camera.

In the example described above, the slide show presentation is scrollable; however, the single view is not scrollable. That is, the in-line camera appears when the user scrolls to the end of the slide show presentation. In addition, there is no preview section to accept or reject a captured photo or video. In some embodiments, rather than the end of the slide show presentation, the in-line camera appears when the screen is scrolled to the beginning of the slide show presentation. In some embodiments, the in-line camera remains in the same viewable position (e.g., in a bounding shape) of the view while only the slideshow presentation scrolls from one direction to another. In some embodiments, the in-line camera is shown in a first portion of the view, while the scrollable slide show and the preview area are shown in a second portion of the view. In that second portion, the preview area may be in a same viewable position (e.g., in a bounding shape) as the user scrolls through media items of the slide show presentation. In this manner, the user can choose a particular location to drop the captured content in the slideshow presentation. Also, similar to many examples described above, the application of some embodiments provides a single scrollable view that includes the in-line camera, the preview section to review the captured content, and the content browsing section that displays representation of the images and/or videos in the slideshow presentation.

VI. Electronic Systems

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves, transitory signals, and electronic signals passing wirelessly or over wired connections.

In this specification, the term "software" is meant to include firmware residing in read-only memory or applications stored in magnetic storage, which can be read into memory for processing by a processor. In addition, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

A. Mobile Device

Figure 15:
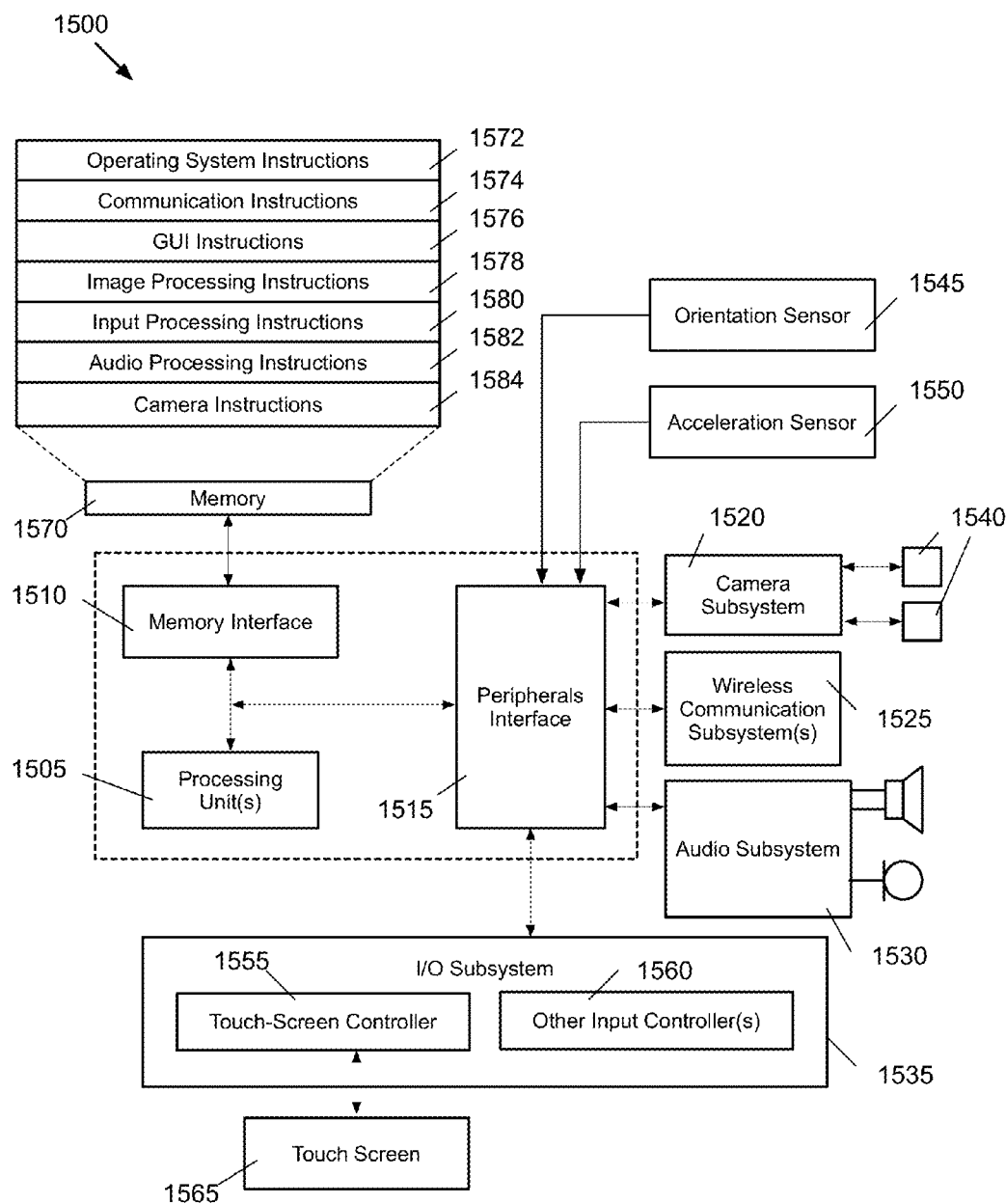
FIG. 15 provides an example of the architecture of a mobile computing device of some embodiments.

The scrollable view application of some embodiments operates on mobile devices. FIG. 15 is an example of an architecture 1500 of such a mobile computing device. Examples of mobile computing devices include smartphones, tablets, laptops, etc. As shown, the mobile computing device 1500 includes one or more processing units 1505, a memory interface 1510 and a peripherals interface 1515.

The peripherals interface 1515 is coupled to various sensors and subsystems, including a camera subsystem 1520, a wireless communication subsystem(s) 1525, an audio subsystem 1530, an I/O subsystem 1535, etc. The peripherals interface 1515 enables communication between the processing units 1505 and various peripherals. For example, an orientation sensor 1545 (e.g., a gyroscope) and an acceleration sensor 1550 (e.g., an accelerometer) is coupled to the peripherals interface 1515 to facilitate orientation and acceleration functions.

The camera subsystem 1520 is coupled to one or more optical sensors 1540 (e.g., a charged coupled device (CCD) optical sensor, a complementary metal-oxide-semiconductor (CMOS) optical sensor, etc.). The camera subsystem 1520 coupled with the optical sensors 1540 facilitates camera functions, such as image and/or video data capturing. The wireless communication subsystem 1525 serves to facilitate communication functions. In some embodiments, the wireless communication subsystem 1525 includes radio frequency receivers and transmitters, and optical receivers and transmitters (not shown in FIG. 15). These receivers and transmitters of some embodiments are implemented to operate over one or more communication networks such as a GSM network, a Wi-Fi network, a Bluetooth network, etc. The audio subsystem 1530 is coupled to a speaker to output audio (e.g., to output different sound effects associated with different image operations). Additionally, the audio subsystem 1530 is coupled to a microphone to facilitate voice-enabled functions, such as voice recognition, digital recording, etc.

The I/O subsystem 1535 involves the transfer between input/output peripheral devices, such as a display, a touch screen, etc., and the data bus of the processing units 1505 through the peripherals interface 1515. The I/O subsystem 1535 includes a touch-screen controller 1555 and other input controllers 1560 to facilitate the transfer between input/output peripheral devices and the data bus of the processing units 1505. As shown, the touch-screen controller 1555 is coupled to a touch screen 1565. The touch-screen controller 1555 detects contact and movement on the touch screen 1565 using any of multiple touch sensitivity technologies. The other input controllers 1560 are coupled to other input/control devices, such as one or more buttons. Some embodiments include a near-touch sensitive screen and a corresponding controller that can detect near-touch interactions instead of or in addition to touch interactions.

The memory interface 1510 is coupled to memory 1570. In some embodiments, the memory 1570 includes volatile memory (e.g., high-speed random access memory), non-volatile memory (e.g., flash memory), a combination of volatile and non-volatile memory, and/or any other type of memory. As illustrated in FIG. 15, the memory 1570 stores an operating system (OS) 1572. The OS 1572 includes instructions for handling basic system services and for performing hardware dependent tasks.

The memory 1570 also includes communication instructions 1574 to facilitate communicating with one or more additional devices; graphical user interface instructions 1576 to facilitate graphic user interface processing; image processing instructions 1578 to facilitate image-related processing and functions; input processing instructions 1580 to facilitate input-related (e.g., touch input) processes and functions; audio processing instructions 1582 to facilitate audio-related processes and functions; and camera instructions 1584 to facilitate camera-related processes and functions. The instructions described above are merely exemplary and the memory 1570 includes additional and/or other instructions in some embodiments. For instance, the memory for a smartphone may include phone instructions to facilitate phone-related processes and functions. The above-identified instructions need not be implemented as separate software programs or modules. Various functions of the mobile computing device can be implemented in hardware and/or in software, including in one or more signal processing and/or application specific integrated circuits.

While the components illustrated in FIG. 15 are shown as separate components, one of ordinary skill in the art will recognize that two or more components may be integrated into one or more integrated circuits. In addition, two or more components may be coupled together by one or more communication buses or signal lines. Also, while many of the functions have been described as being performed by one component, one of ordinary skill in the art will realize that the functions described with respect to FIG. 15 may be split into two or more integrated circuits.

B. Computer System

Figure 16:
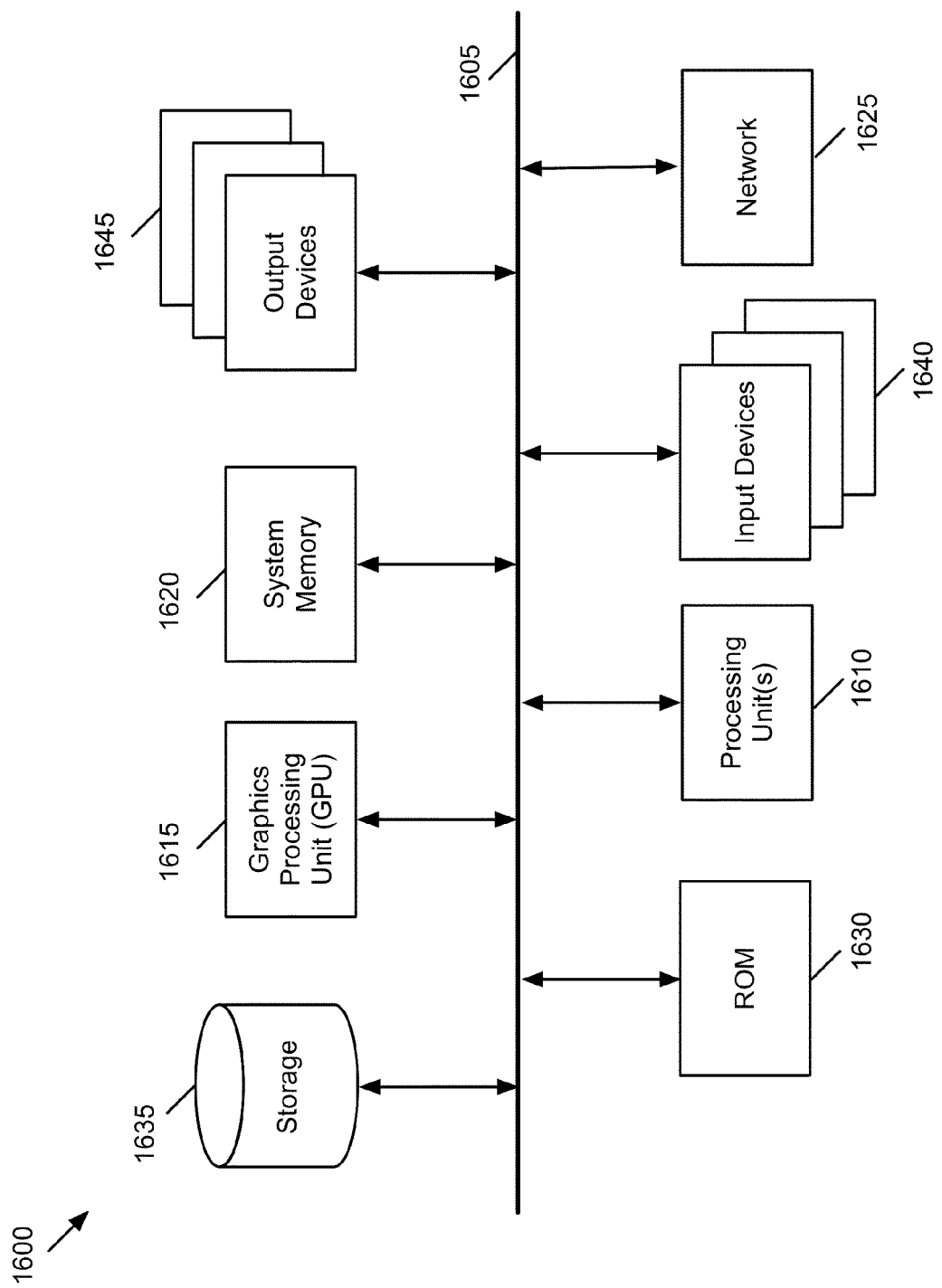
FIG. 16 conceptually illustrates an example of an electronic system of some embodiments.

FIG. 16 conceptually illustrates another example of an electronic system 1600 with which some embodiments of the invention are implemented. The electronic system 1600 may be a computer (e.g., a desktop computer, personal computer, tablet computer, etc.), phone, PDA, or any other sort of electronic or computing device. Such an electronic system includes various types of computer readable media and interfaces for various other types of computer readable media. Electronic system 1600 includes a bus 1605, processing unit(s) 1610, a graphics processing unit (GPU) 1615, a system memory 1620, a network 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the GPU 1615, the system memory 1620, and the permanent storage device 1635.

From these various memory units, the processing unit(s) 1610 retrieves instructions to execute and data to process in order to execute the processes of the invention. The processing unit(s) may be a single processor or a multi-core processor in different embodiments. Some instructions are passed to and executed by the GPU 1615. The GPU 1615 can offload various computations or complement the image processing provided by the processing unit(s) 1610.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash memory device, etc., and its corresponding drive) as the permanent storage device. Like the permanent storage device 1635, the system memory 1620 is a read-and-write memory device. However, unlike storage device 1635, the system memory 1620 is a volatile read-and-write memory, such a random access memory. The system memory 1620 stores some of the instructions and data that the processor needs at runtime. In some embodiments, the invention's processes are stored in the system memory 1620, the permanent storage device 1635, and/or the read-only memory 1630. For example, the various memory units include instructions for processing multimedia clips in accordance with some embodiments. From these various memory units, the processing unit(s) 1610 retrieves instructions to execute and data to process in order to execute the processes of some embodiments.

The bus 1605 also connects to the input and output devices 1640 and 1645. The input devices 1640 enable the user to communicate information and select commands to the electronic system. The input devices 1640 include alphanumeric keyboards and pointing devices (also called "cursor control devices"), cameras (e.g., webcams), microphones or similar devices for receiving voice commands, etc. The output devices 1645 display images generated by the electronic system or otherwise output data. The output devices 1645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 16, bus 1605 also couples electronic system 1600 to a network 1625 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "non-transitory computer readable medium" "computer readable media," "non-transitory readable media", "machine readable medium", and "non-transitory machine readable medium" are entirely restricted to tangible, physical objects that store information in a form that is readable by a computers. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. For instance, many of the figures illustrate various touch gestures (e.g., taps, double taps, swipe gestures, press and hold gestures, etc.). However, many of the illustrated operations could be performed via different touch gestures (e.g., a swipe instead of a tap, etc.) or by non-touch input (e.g., using a cursor controller, a keyboard, a touchpad/trackpad, a near-touch sensitive screen, etc.). In addition, some of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

While the invention has been described with reference to numerous specific details, one of ordinary skill in the art will recognize that the invention can be embodied in other specific forms without departing from the spirit of the invention. For example, one of ordinary skill in the art will understand that many of the UI items of the figures can also be activated and/or set by a cursor control device (e.g., a mouse or trackball), a stylus, keyboard, a finger gesture (e.g., placing, pointing, tapping one or more fingers) near a near-touch sensitive screen, or any other control system in some embodiments. Thus, one of ordinary skill in the art would understand that the invention is not to be limited by the foregoing illustrative details, but rather is to be defined by the appended claims.

What is claimed is:

1. A non-transitory machine readable medium storing sets of instructions that when executed by at least one processing unit of a mobile computing device provides a user interface (UI) of a media sharing application, the UI comprising:
  a single scrollable UI view on the mobile device, including:
    a first UI display in a single UI having a viewing area for displaying a live view of a scene from a vantage point of a camera of the device and a media capture control for directing the camera to capture a media content associated with the scene;
    a second UI display in the single UI for displaying scrollable media contents that were previously added to a content group; and
    a third UI display in the single UI, automatically appearing in the UI if media is captured from the camera by the first UI display, for displaying a preview of media content captured by the camera along with a set of controls, the set of controls comprising a first control for adding the captured media content to the content group and a second control for removing the captured media content from the third UI display,
    wherein the first, second, and third UI displays are accessible by scrolling to each of the first, second, and third UI displays of the single scrollable UI view.

2. The non-transitory machine readable medium of claim 1, wherein the media content is a photo or a video clip.

3. The non-transitory machine readable medium of claim 1, wherein when the media capture control is used to capture a media content, the captured media content is stored on a local drive of the device and is associated with a media library, wherein selection of the second control removes the media content from the third UI display but retains the media content on the local drive as well as the media content's association with the media library.

4. The non-transitory machine readable medium of claim 1, wherein the set of controls further comprises a third control for to editing the media content prior to adding the media content.

5. The non-transitory machine readable medium of claim 1, wherein the set of controls further comprises a third control for leaving a comment regarding the media content prior to adding the media content.

6. The non-transitory machine readable medium of claim 1, wherein the content group is a person's personal media stream, and the media content is distributed to one or more other computing devices of the person associated with the personal media stream.

7. The non-transitory machine readable medium of claim 1, wherein the content group is a shared media stream, and the media content is distributed to one or more other computing devices of any person that is associated with the shared media stream.

8. The non-transitory machine readable medium of claim 1, wherein the content group represents a set of media contents that is posted to a web site.

9. The non-transitory machine readable medium of claim 1, wherein the single scrollable UI view is the first view that is shown when the media sharing application has been opened so that the application's user does not have to navigate to any other view to capture, preview and add the media content.

10. The non-transitory machine readable medium of claim 1, wherein a size of each portion of the UI is different from one or more other portions or is the same across each portion.

11. A non-transitory machine readable medium storing sets of instructions that when executed by at least one processing unit of a mobile computing device provides a user interface (UI) for viewing and creating a slide show presentation, the UI comprising:
  a single scrollable UI view including:
    a first UI display in a single UI having a viewing area for displaying a live view of a scene from a vantage point of a camera of the mobile computing device and a media capture control for directing the camera to capture a media content of the scene; and
    a second UI display in the single UI having a first region to display a scrollable slide show presentation, and a second region, automatically appearing in the UI if media is captured from the camera by the first UI display, for displaying the captured media content along with a set of controls for adding the media content to the scrollable slide show presentation,
    wherein the first and second UI displays in the single UI are accessible by scrolling between the first and second UI displays of the single scrollable UI view.

12. The non-transitory machine readable medium of claim 11, wherein the media content is a photo or a video clip.

13. The non-transitory machine readable medium of claim 11, wherein the second region includes at least one other control for editing the media content prior to adding the media content to the scrollable slideshow presentation.

14. The non-transitory machine readable medium of claim 11, wherein the second region includes at least one other control for leaving a comment regarding the media content prior to adding the media content to the scrollable slideshow presentation.

15. A method of defining a user interface (UI) of a media sharing application that executes on a mobile computing device, the method comprising:
  defining a single scrollable UI view by:
    defining a first UI display in a single UI having a viewing area for displaying a live view of a scene from a vantage point of a camera of the mobile computing device and a media capture control for directing the camera to capture a media content associated with the scene;
    defining a second UI display in the single UI for displaying media contents that were previously added to a content group; and
    defining a third UI display in the single UI, automatically appearing in the UI if media is captured from the camera by the first UI display, for displaying media content captured by the camera of the mobile computing along with a set of controls comprising a commenting control for adding a comment to the captured media content,
    wherein the first, second, and third UI displays in the single UI are accessible by scrolling to each of the first, second, and third UI displays of the single scrollable UI view.

16. The method of claim 15, wherein the media content is a photo or a video clip.

17. The method of claim 15, wherein the set of controls comprises a control for deleting the media content.

18. The method of claim 17, wherein when the media capture control is used to capture a media content, the captured media content is stored on a local drive of the device and is associated with a media library, wherein selection of the control for deleting removes the media content from the third UI display but retains the media content on the local drive as well as the media content's association with the media library.

19. The method of claim 15, wherein the content group is a shared media stream, and the media content is distributed across to one or more other computing devices of any person that is associated with the shared media stream.

* * * * *